United States Patent
Ono et al.

(10) Patent No.: US 12,267,611 B2
(45) Date of Patent: Apr. 1, 2025

(54) SOLID-STATE IMAGING DEVICE AND CONTROL METHOD OF THE SAME

(71) Applicant: Sony Semiconductor Solutions Corporation, Kanagawa (JP)

(72) Inventors: Toshiaki Ono, Kanagawa (JP); Yorito Sakano, Kanagawa (JP); Masaki Sakakibara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 174 days.

(21) Appl. No.: 18/017,105

(22) PCT Filed: Jun. 15, 2021

(86) PCT No.: PCT/JP2021/022735
§ 371 (c)(1),
(2) Date: Jan. 20, 2023

(87) PCT Pub. No.: WO2022/024574
PCT Pub. Date: Feb. 3, 2022

(65) Prior Publication Data
US 2023/0300495 A1    Sep. 21, 2023

(30) Foreign Application Priority Data

Jul. 29, 2020    (JP) .................................. 2020-128380

(51) Int. Cl.
H04N 25/772    (2023.01)
H04N 25/59    (2023.01)
H04N 25/709    (2023.01)
H04N 25/778    (2023.01)

(52) U.S. Cl.
CPC .......... *H04N 25/772* (2023.01); *H04N 25/59* (2023.01); *H04N 25/709* (2023.01); *H04N 25/778* (2023.01)

(58) Field of Classification Search
None
See application file for complete search history.

(56) References Cited

FOREIGN PATENT DOCUMENTS

| | | |
|---|---|---|
| JP | 2009189068 A | 8/2009 |
| JP | 2009225324 A | 10/2009 |
| JP | 2017135576 A | 8/2017 |
| JP | 2017175345 A | 9/2017 |

(Continued)

OTHER PUBLICATIONS

International Search Report (PCT/ISA/210), International Application No. PCT/JP2021/022735, dated Sep. 14, 2021.

*Primary Examiner* — Mark T Monk
(74) *Attorney, Agent, or Firm* — Michael Best & Friedrich LLP

(57) ABSTRACT

Solid-state imaging devices are disclosed. In one example, a solid-state imaging device includes a pixel array with unit pixels that accumulate charge in a floating diffusion (FD) region. A pixel signal reading circuit reads a pixel signal based on the charge from the FD region of a unit pixel. The pixel signal reading circuit includes an AD converter that performs AD conversion on the pixel signal, and a determination circuit that performs brightness/darkness determination of light received by the unit pixel on the basis of the pixel signal. The determination circuit selectively controls executing or stopping of the AD conversion on a pixel signal to be subsequently read according to a result of the brightness/darkness determination.

24 Claims, 28 Drawing Sheets

(56) References Cited

FOREIGN PATENT DOCUMENTS

| JP | 2018191027 A | 11/2018 |
| JP | 2019004454 A | 1/2019 |
| JP | 2020057883 A | 4/2020 |

FIG. 4
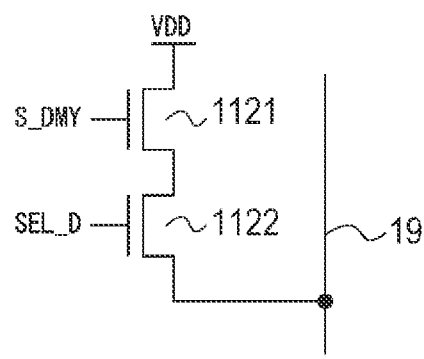
(a)
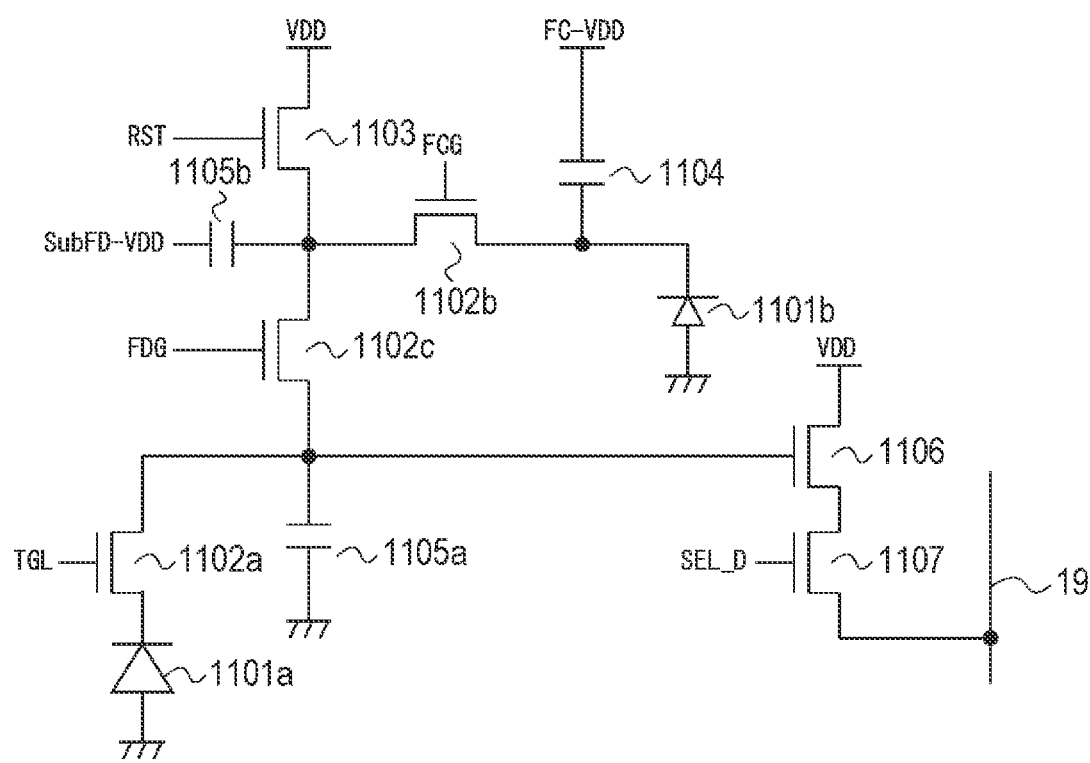
(b)

FIG. 6

| | DETERMINATION MODE | | HIGH SENSITIVITY MODE | | | | | | LOW SENSITIVITY MODE | | | | | |
|---|---|---|---|---|---|---|---|---|---|---|---|---|---|---|
| TIME | TJ1 | TJ2 | T1 | T2 | TGL TRANSFER | T3 | TGL TRANSFER | T4 | T5 | RESET | T6 | T7 | RESET | T8 |
| SIGNAL | BASE SIGNAL | SP1 | SP1L | SP1H | | SP1H | | SP1L | SP1L | | SP1L | SP2 | | SP2 |
| PHOTOELECTRIC CONVERSION EFFICIENCY | | MIDDLE | MIDDLE | HIGH | | HIGH | | MIDDLE | MIDDLE | | MIDDLE | LOW | | LOW |
| SIGNAL TYPE | P-PHASE | D-PHASE | P-PHASE | P-PHASE | | D-PHASE (FOR T2) | | D-PHASE | D-PHASE (FOR T6) | | P-PHASE | D-PHASE (FOR T8) | | P-PHASE |
| OVERFLOW POSSIBILITY | NO | POSSIBLE | POSSIBLE | POSSIBLE | | POSSIBLE | | POSSIBLE | NO | | NO | NO | | NO |

SOLID-STATE IMAGING DEVICE AND CONTROL METHOD OF THE SAME

TECHNICAL FIELD

The present disclosure relates to a solid-state imaging device and a control method thereof.

BACKGROUND ART

In order for a solid-state imaging device to obtain good image quality under an environment where a difference in brightness/darkness (brightness difference) of light is large, it is required to have a wide dynamic range, and various types of dynamic range expansion techniques have been conventionally proposed. For example, the time division method is a technique of expanding a dynamic range by imaging in a time division manner with different sensitivities by each light receiving element and combining pixel signals output in the time division. In addition, the spatial division method is a technique of expanding a dynamic range by combining pixel signals output from light receiving elements having different sensitivities.

For example, Patent Document 1 below discloses a solid-state imaging device that controls a unit pixel including a first photoelectric conversion section and a second photoelectric conversion section having lower sensitivity than the first photoelectric conversion section such that a drive section reads a first data signal based on a charge generated by the first photoelectric conversion section, a second data signal based on coupling between a charge generated by the first photoelectric conversion section and a charge generated by the second photoelectric conversion section, and a third data signal based on a charge generated by the second photoelectric conversion section.

CITATION LIST

Patent Document

Patent Document 1: Japanese Patent Application Laid-Open No. 2017-175345

SUMMARY OF THE INVENTION

Problems to be Solved by the Invention

In a solid-state imaging device, a pixel signal read from a pixel is typically analog-digital converted by an analog-digital converter, and subjected to signal processing by a digital signal processor (DSP). In the dynamic range expansion technique of the solid-state imaging device as disclosed in Patent Document 1, after all the pixel signals (first to third data signals) are read from one pixel, the pixel signals are combined and processed. Therefore, the processing time is restricted from the viewpoint of the frame rate. In addition, since the AD conversion processing is performed on each of the read pixel signals, there is a problem that power consumption increases accordingly.

Therefore, an object of the technology according to embodiments of the present disclosure is to provide a solid-state imaging device capable of speeding up processing and/or reducing power consumption while achieving expansion of a dynamic range.

Solutions to Problems

The present technology for solving the problems described above is configured to include the following invention specifying matters or technical features.

The present technology according to a certain aspect is a solid-state imaging device including: a pixel array section including a plurality of unit pixels that includes a photoelectric conversion section that performs photoelectric conversion according to intensity of light received and is capable of accumulating a charge photoelectrically converted by the photoelectric conversion section in a predetermined floating diffusion region; a system control section that controls the pixel array section; and a pixel signal reading mechanism that reads a pixel signal based on the charge from the predetermined floating diffusion region of a unit pixel of the plurality of unit pixels via a read signal line under control of the system control section. The pixel signal reading mechanism may include an AD converter that performs AD conversion processing on the pixel signal read, and a determination section that performs determination of brightness/darkness of light received by the unit pixel on the basis of a pixel signal read from the unit pixel in a determination phase. Then, the determination section may selectively control execution or stop of the AD conversion processing by the AD converter on a pixel signal read subsequent to the determination phase according to a result of the determination.

In particular, the pixel signal reading mechanism can perform control such that the pixel signal corresponding to dark light among pixel signals read from the plurality of unit pixels is subjected to the AD conversion processing in a high sensitivity mode, and perform control such that the pixel signal corresponding to bright light among the pixel signals read from the plurality of unit pixels is subjected to the AD conversion processing in a low sensitivity mode, in accordance with a result of the determination of the brightness/darkness.

In addition, the present technology according to another aspect is a control method of a solid-state imaging device including a pixel array section. The control method may include: performing exposure processing on a plurality of unit pixels in the pixel array section; reading a pixel signal based on charge accumulated in a predetermined floating diffusion region in a unit pixel of the plurality of unit pixels via a read signal line in a determination phase after the exposure processing; performing determination of brightness/darkness of light received by the unit pixel by the exposure processing on the basis of the pixel signal read; and performing AD conversion processing by an AD converter on a pixel signal read subsequent to the determination phase. Then, performing the AD conversion processing may include selectively controlling execution or stop of the AD conversion processing according to a result of the determination.

In addition, the performing the AD conversion processing may include: performing the AD conversion processing on the pixel signal corresponding to dark light in a case where a result of the determination indicates that the unit pixel receives the dark light; and performing the AD conversion processing on the pixel signal corresponding to bright light in a case where the result of the determination indicates that the unit pixel receives the bright light.

Moreover, the present technology according to another aspect is an electric device including: a solid-state imaging device; and a control unit that performs control on the basis of image data captured by the solid-state imaging device. The solid-state imaging device may include: a pixel array section including a plurality of unit pixels that includes a photoelectric conversion section that performs photoelectric conversion according to intensity of light received and is capable of accumulating a charge photoelectrically converted by the photoelectric conversion section in a predetermined floating diffusion region; a system control section that controls the pixel array section; and a pixel signal reading mechanism that reads a pixel signal based on the charge from the predetermined floating diffusion region of a unit pixel of the plurality of unit pixels via a read signal line under control of the system control section. In addition, the pixel signal reading mechanism may include an AD converter that performs AD conversion processing on the pixel signal seen, and a determination section that performs determination of brightness/darkness of light received by the unit pixel on the basis of a pixel signal read from the unit pixel in a determination phase. Then, the determination section may selectively control execution or stop of the AD conversion processing by the AD converter on a pixel signal read subsequent to the determination phase according to a result of the determination.

Note that, in the present specification and the like, means does not simply mean physical means, but includes a case where a function of the means is implemented by software. In addition, the function of one means may be implemented by two or more physical means, or the function of two or more means may be implemented by one physical means. In addition, a "system" refers to a logical assembly of a plurality of devices (or functional modules that implement specific functions), and it does not matter whether or not each device or each functional module is in a single housing.

Other technical features, objects, and effects or advantages of the present invention will be clarified by the following embodiments described with reference to the accompanying drawings. The effects described in the present specification are merely examples and are not limited, and other effects may be provided.

BRIEF DESCRIPTION OF DRAWINGS

FIG. 4 is a diagram depicting an example of a circuit configuration of a base signal generation circuit in the solid-state imaging device according to an embodiment of the present technology.

FIG. 6 is a diagram for explaining an example of a schematic operation of the pixel signal reading mechanism in the solid-state imaging device according to an embodiment of the present technology.

MODE FOR CARRYING OUT THE INVENTION

Figure 1:
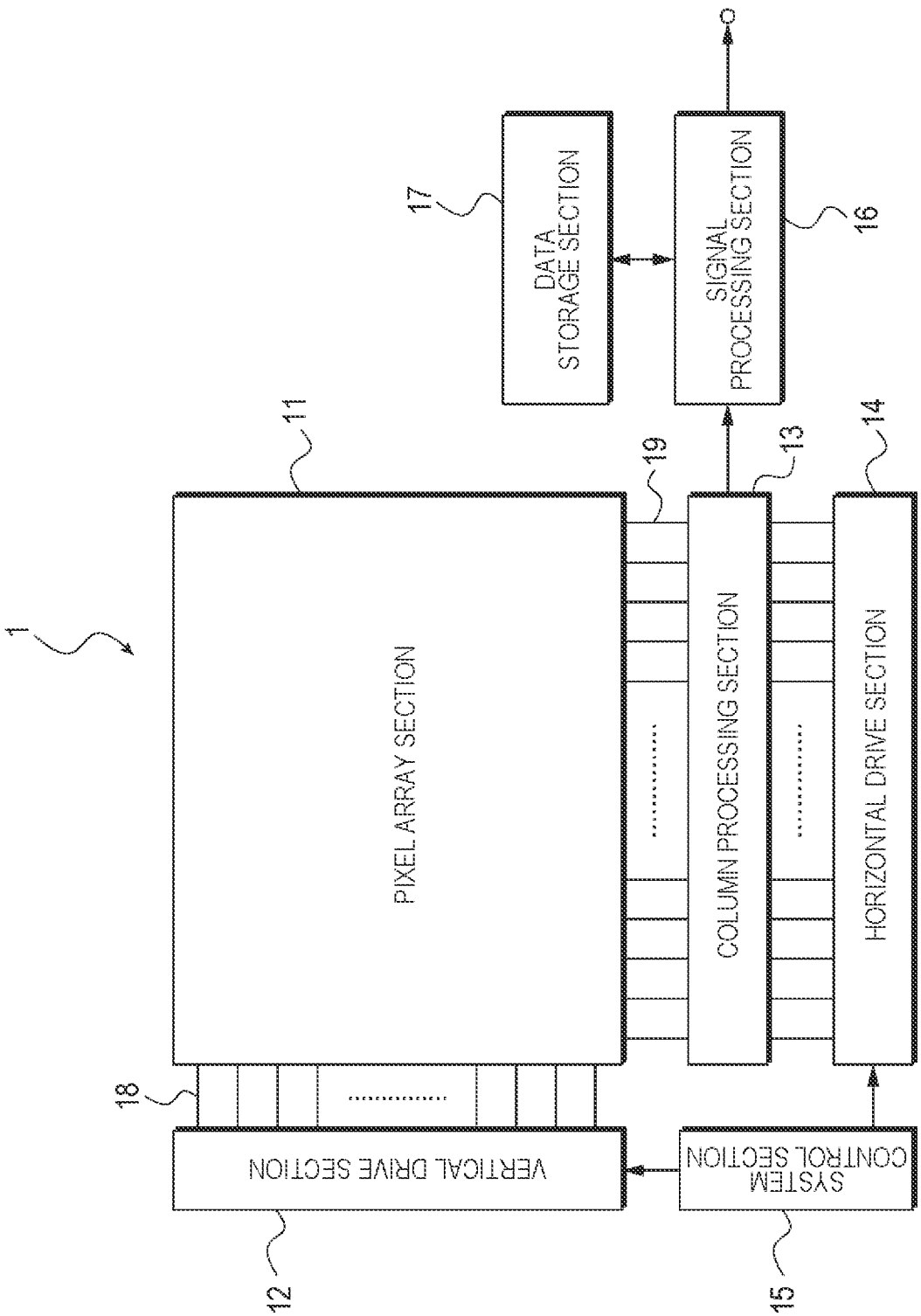
FIG. 1 is a block diagram depicting an example of a schematic configuration of a solid-state imaging device according to an embodiment of the present technology.

Hereinafter, embodiments of the present invention will be described with reference to the drawings. However, the embodiments described below are merely examples, and are not intended to exclude various modifications and applications of techniques that are not explicitly described below. The present invention can be implemented by making various modifications (for example, combining the respective embodiments or the like) without departing from the gist thereof. In addition, in the following description of the drawings, the same or similar parts are denoted by the same or similar reference numerals. The drawings are schematic and do not necessarily match actual dimensions, ratios, and the like. Portions having different dimensional relationships or ratios may be included between the drawings. Note that the present disclosure will be described in the following embodiments.
1. First Embodiment
2. Second Embodiment (Example of Using Different Floating Diffusion Regions)
3. Third Embodiment (Modification of Base Signal Generation Circuit)
4. Fourth Embodiment (Example of Using Two Systems of Read Signal Lines)
5. Fifth Embodiment (Modification of Unit Pixel)
6. Application Example to Mobile Body 1. First Embodiment According to the present embodiment, a mechanism (hereinafter, referred to as a "pixel signal reading mechanism") related to pixel signal reading processing in a solid-state imaging device reads a pixel signal based on a charge amount in a predetermined floating diffusion region in a head phase of a readout period of a pixel signal after exposure (light reception) processing, determines a voltage level (signal level) of the pixel signal, and selectively controls processing on a pixel signal to be subsequently read according to a result of the determination. Hereinafter, the head phase of the readout period of the pixel signal after the exposure processing may be referred to as a "determination phase".

FIG. 1 is a block diagram depicting an example of a schematic configuration of a solid-state imaging device according to an embodiment of the present technology. A solid-state imaging device 1 is a semiconductor device that converts a charge amount corresponding to intensity of light formed on each pixel into an electric signal using a photoelectric conversion element such as a photodiode or the like constituting each pixel, and outputs the electric signal as image data, and is configured as, for example, a CMOS image sensor. The solid-state imaging device 1 can be integrally configured as, for example, a system on a chip (SoC) such as a CMOS LSI, but for example, some components described below may be configured as separate LSIs.

As depicted in the drawing, the solid-state imaging device 1 includes components such as a pixel array section 11, a vertical drive section 12, a column processing section 13, a horizontal drive section 14, a system control section 15, a signal processing section 16, and a data storage section 17, for example.

The pixel array section 11 includes photoelectric conversion element groups such as photodiodes or the like constituting pixels (corresponding to a unit pixel 110 in FIG. 3) arrayed in a horizontal direction (row direction) and a vertical direction (column direction). The pixel array section 11 converts a charge amount corresponding to the intensity of the incident light formed on each pixel into an electric signal and outputs the electric signal as a pixel signal. The pixel array section 11 can include, for example, effective pixels arranged in a region capable of receiving actual light and dummy pixels arranged outside the region and shielded by metal or the like. Note that an optical element such as a micro-on-chip lens or a color filter that condenses incident light is formed on each pixel of the pixel array section 11 (not depicted).

The vertical drive section 12 includes a shift register, an address decoder, and the like. The vertical drive section 12 supplies a drive signal or the like to each pixel via a plurality of pixel drive lines 18, thereby driving each pixel of the pixel array section 11, for example, simultaneously or row by row.

The column processing section 13 reads a pixel signal from each pixel via a vertical signal line (VSL) 19 for each pixel column of the pixel array section 11, and performs noise removal processing, correlated double sampling (CDS) processing, analog-to-digital (A/D) conversion processing, and the like. The pixel signal processed by the column processing section 13 is output to the signal processing section 16. As will be described later, the column processing section 13 of the present embodiment is configured to be able to selectively control processing on a signal read from each pixel according to a predetermined determination condition. In this case, the column processing section 13 outputs information indicating the attribute of the processed pixel signal to the signal processing section 16. In the present example, the column processing section 13 passes, to the signal processing section 16, attribute information (for example, a flag) indicating whether the pixel signal corresponds to dark light (high sensitivity) or bright light (low sensitivity). In the present disclosure, the vertical signal line (VSL) is an example of a read signal line.

The horizontal drive section 14 includes a shift register, an address decoder, and the like. The horizontal drive section 14 sequentially selects pixels corresponding to the pixel columns of the column processing section 13. By the selective scanning by the horizontal drive section 14, the pixel signals subjected to the signal processing for each pixel in the column processing section 13 are sequentially output to the signal processing section 16.

The system control section 15 includes a timing generator that generates various timing signals and the like. The system control section 15 performs drive control of the vertical drive section 12, the column processing section 13, and the horizontal drive section 14 on the basis of, for example, a timing signal generated by a timing generator (not depicted).

The signal processing section 16 performs signal processing such as arithmetic processing or the like on the pixel signal supplied from the column processing section 13 while temporarily storing data in the data storage section 17 as necessary, and outputs an image signal based on each pixel signal. In addition, the signal processing section 16 performs signal processing according to the flag output from the column processing section 13. That is, the signal processing section 16 performs image processing suitable for the high sensitivity mode on the pixel signal supplied from the column processing section 13 with the flag indicating the high sensitivity mode to be described later, and performs image processing suitable for the low sensitivity mode with the flag indicating the low sensitivity mode to be described later.

Note that the solid-state imaging device 1 to which the present technology is applied is not limited to the above-described configuration. For example, as described in Patent Document 1, the solid-state imaging device 1 may be configured such that the data storage section 17 is arranged at a subsequent stage of the column processing section 13, and the pixel signal output from the column processing section 13 is supplied to the signal processing section 16 via the data storage section 17. Alternatively, the solid-state imaging device 1 may be configured such that the column processing section 13, the data storage section 17, and the signal processing section 16 connected in cascade process the respective pixel signals in parallel.

Figure 2:
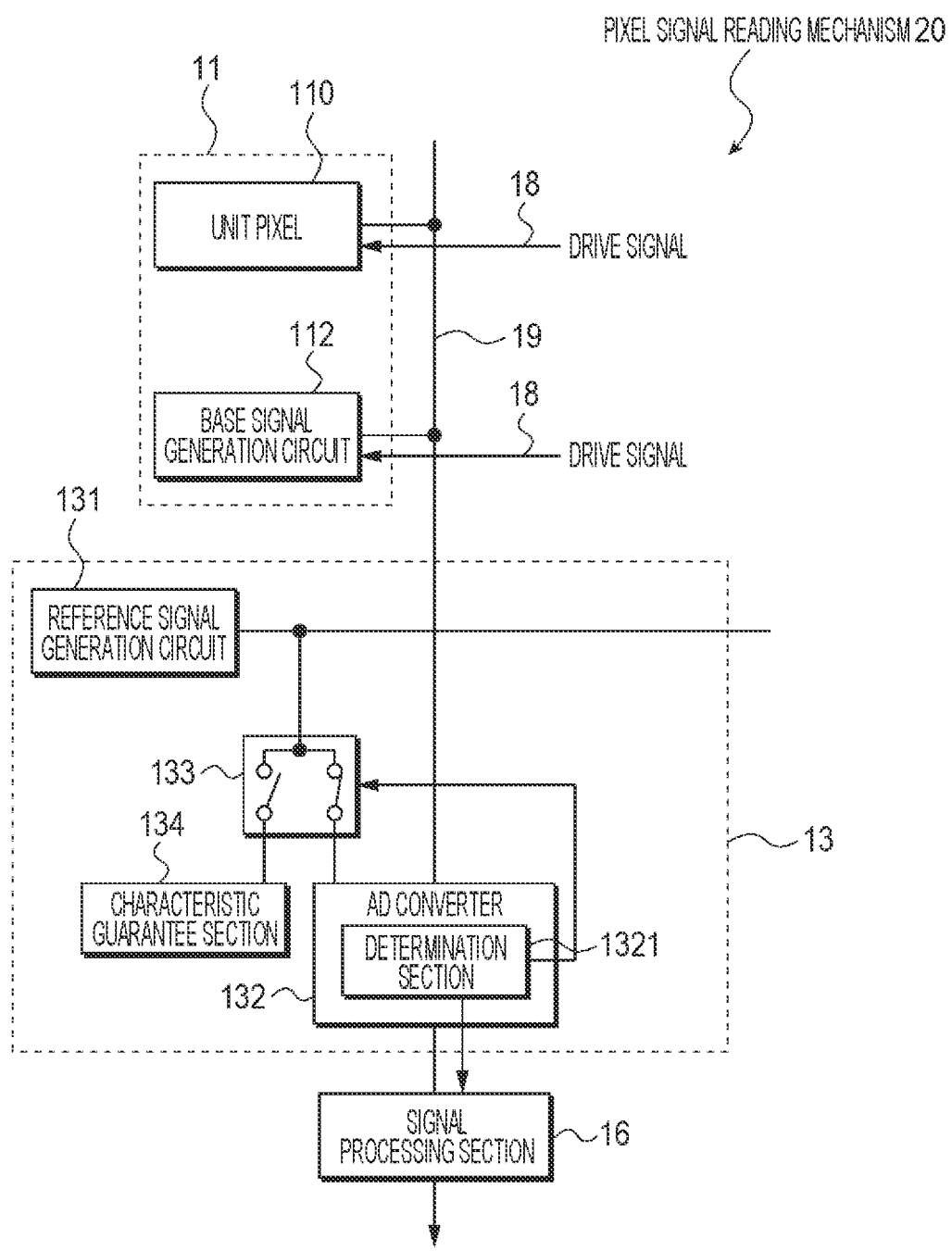
FIG. 2 is a block diagram for explaining an example of a mechanism related to pixel signal reading processing in the solid-state imaging device according to an embodiment of the present technology.

FIG. 2 is a block diagram for explaining an example of a pixel signal reading mechanism in the solid-state imaging device according to an embodiment of the present technology. In the drawing, a pixel signal reading mechanism 20 from one unit pixel 110 in one pixel column is exemplarily depicted.

The pixel signal reading mechanism 20 of the present embodiment reads a pixel signal based on a charge amount in a predetermined floating diffusion region in a head phase (determination phase) of a readout period of a pixel signal after exposure processing, and selectively controls processing on a pixel signal to be subsequently read according to a voltage level of the read pixel signal. That is, when reading the pixel signal from the unit pixel 110, the pixel signal reading mechanism 20 determines whether the unit pixel 110 receives bright light (strong light) or dark light (weak light), and performs appropriate processing (for example, an operation or a stop of the AD conversion processing) on the pixel signal read subsequently in response to the determination. As a result, the amount of pixel signals to be subjected to AD conversion processing can be reduced, and power consumption associated with the AD conversion processing can be reduced. Alternatively, as described in another embodiment, only one of the pixel signals read in parallel from each of the predetermined floating diffusion regions in the unit pixel 110 is subjected to the AD conversion processing, whereby the frame rate can be improved by shortening the processing time. Note that, as described later, the pixel signal reading mechanism 20 performs AD conversion processing on the basis of a pixel signal in a pre-charge phase (hereinafter, referred to as a "P-phase") and a pixel signal in a data phase (hereinafter, referred to as a "D-phase").

In the drawing, as the configuration of the pixel array section 11, a unit pixel 110 as an effective pixel and a base signal generation circuit 112 are depicted. In addition, as a configuration of the column processing section 13, a reference signal generation circuit 131, an analog-digital converter (hereinafter, referred to as an "AD converter") 132, an output control circuit 133, and a characteristic guarantee section 134 are depicted.

As described above, the unit pixel 110 is a circuit (pixel circuit) related to each pixel constituting the pixel array section 11. Each unit pixel 110 is connected to the pixel drive line 18 for each pixel row and the vertical signal line 19 for each pixel column. In the present disclosure, for example, each subpixel such as red (R), green (G), and blue (B) is referred to as a unit pixel 110, but the present invention is not limited thereto. An example of a specific circuit configuration of the unit pixel 110 will be described with reference to FIG. 3.

The base signal generation circuit 112 generates and outputs a signal (hereinafter, referred to as a "base signal") having a voltage serving as a basis for determining a voltage level of a signal based on a charge extracted from a predetermined floating diffusion region (see FIG. 3) of the unit pixel 110. The base signal generation circuit 112 is connected to the pixel drive line 18 for each pixel row and the vertical signal line 19 for each pixel column. As an example, the base signal generation circuit 112 can be configured as a so-called sunspot circuit capable of outputting an arbitrary voltage. In addition, as another example, the base signal generation circuit 112 can be implemented by a dummy unit pixel that is shielded from light. As still another example, for the base signal generation circuit 112, a unit pixel in which reading of a pixel signal has already been performed immediately before and which is in a reset state may be used. Some examples of a circuit configuration of the base signal generation circuit 112 will be described with reference to FIG. 4.

The reference signal generation circuit 131 generates and outputs a reference signal necessary for AD conversion processing by the AD converter 132. The reference signal is, for example, a gradient signal (RAMP signal) whose voltage level changes in a gradient with time.

The AD converter 132 converts a pixel signal in an analog format output from the unit pixel 110 into a pixel signal (pixel data) in a digital format. The AD converters 132 are provided in parallel for the respective vertical signal lines 19 corresponding to the pixel columns. In the present disclosure, the AD converter 132 is configured as a single-slope AD converter, but the present invention is not limited thereto. As described later, the AD converter 132 includes, for example, a comparator 1322 and a counter 1223. In the present disclosure, an up/down counter (hereinafter, referred to as a "U/D counter") is depicted as the counter 1223, but the present invention is not limited thereto, and a gray code counter may be used. The AD converter 132 performs counting by the U/D counter 1323 while comparing the reference signal supplied from the reference signal generation circuit 131 with the pixel signal read from the unit pixel 110 over time by the comparator 1322, and outputs the counted value. More specifically, in the P-phase in which the unit pixel 110 is at the reset voltage level, the AD converter 132 performs down counting by the U/D counter 1323 to hold the count value, and in the D-phase in which the unit pixel 110 is at the signal voltage level, the AD converter performs up counting by the U/D counter 1323, thereby outputting the final count value as a pixel signal in a digital format to the signal processing section 16. Therefore, the pixel signal in the digital format at this time is a difference between the D-phase count value and the P-phase count value, and is data subjected to correlated double sampling (CDS).

In addition, the AD converter 132 of the present embodiment includes a determination section 1321 for selectively controlling processing on a pixel signal read from each unit pixel 110. As will be described later, the determination section 1321 is implemented by the comparator 1322 operating in the determination mode. In the determination phase after the exposure processing, the determination section 1321 determines whether the read pixel signal is a pixel signal corresponding to dark light or a pixel signal corresponding to bright light. In accordance with a result of the determination by the determination section 1321, the AD converter 132 is controlled to operate in a predetermined operation mode (for example, either the high sensitivity mode or the low sensitivity mode). In addition, the determination section 1321 outputs information (for example, a flag) indicating the determination result to the signal processing section 16 together with the pixel signal after the AD conversion processing.

The output control circuit 133 exclusively switches the output of the reference signal according to the determination result by the determination section 1321. That is, according to the determination result by the determination section 1321, the output control circuit 133 switches whether to output the reference signal to the AD converter 132 in a period in which a pixel signal corresponding to dark light is read or to output the reference signal to the characteristic guarantee section 134 so that the AD converter 132 does not operate in a period in which a pixel signal corresponding to bright light is read.

The characteristic guarantee section 134 guarantees the operation characteristic of the reference signal generation circuit 131. The characteristic guarantee section 134 includes, for example, a capacitive element. That is, the characteristic guarantee section 134 is electrically connected to the reference signal generation circuit 131 while the operation of the AD converter 132 is stopped, and gives a predetermined capacitive impedance to the reference signal generation circuit 131, thereby preventing a fluctuation in the capacitive impedance when viewed from the reference signal generation circuit 131.

Figure 3:
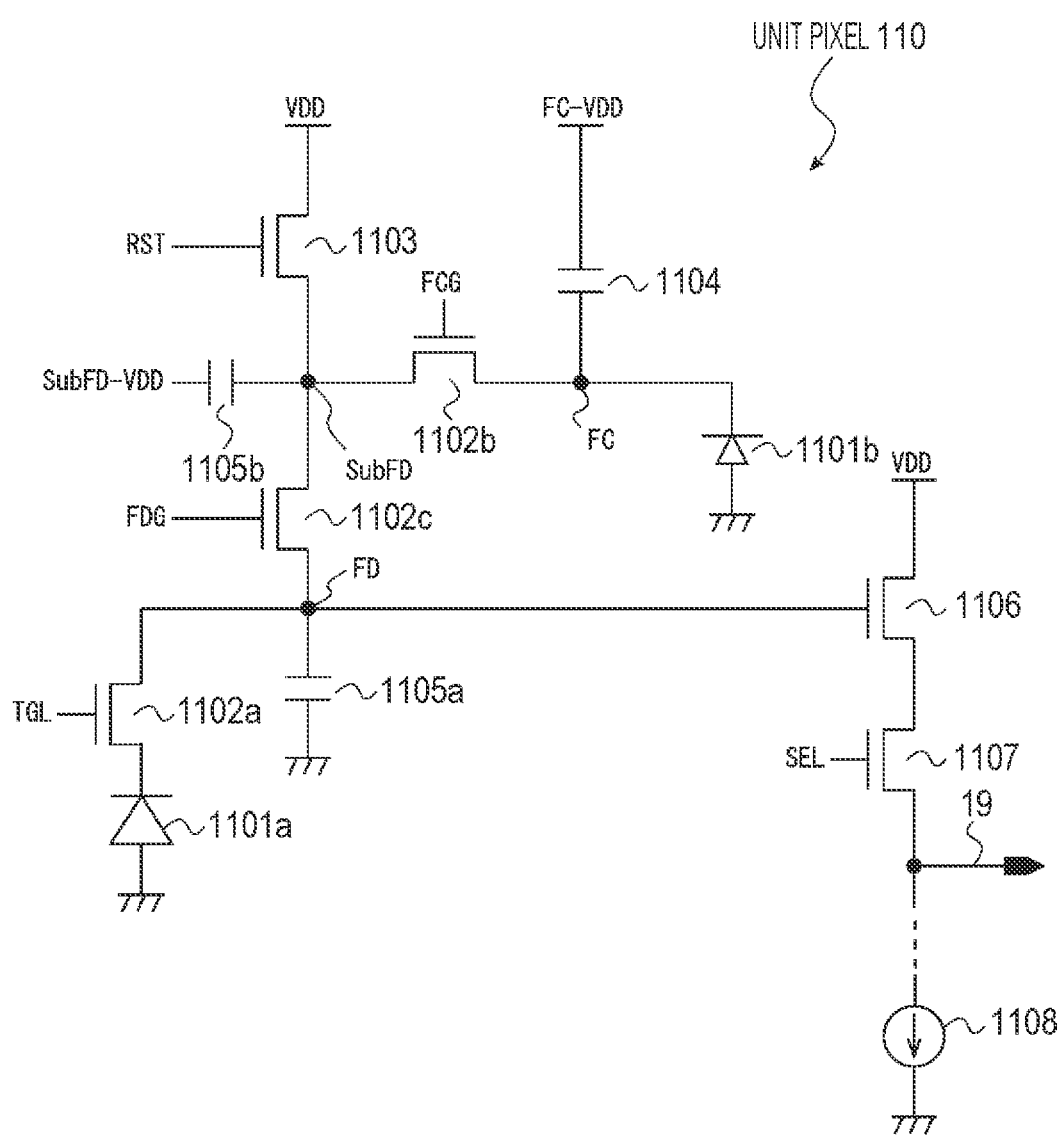
FIG. 3 is a diagram depicting an example of a circuit configuration of a unit pixel in a pixel array section of the solid-state imaging device according to an embodiment of the present technology.

FIG. 3 is a diagram depicting an example of a circuit configuration of a unit pixel in a pixel array section of the solid-state imaging device according to an embodiment of the present technology.

As depicted in the drawing, the unit pixel 110 of the present example includes a first photoelectric conversion section 1101*a*, a second photoelectric conversion section 1101*b*, a first transfer gate section 1102*a* to a third transfer gate section 1102*c*, a reset gate section 1103, a charge accumulation section 1104, a first floating diffusion section (hereinafter, referred to as a "first FD section") 1105*a*, a second floating diffusion section (hereinafter, referred to as a "second FD section") 1105*b*, an amplification transistor 1106, and a selection transistor 1107. In the present example, each transistor in the unit pixel 110 is an NMOS transistor, but the present invention is not limited thereto.

In addition, a plurality of drive lines for supplying various drive signals TGL, FCG, FDG, RST, SEL, and the like to the unit pixel 110 is wired, for example, for each pixel row as the pixel drive lines 18 depicted in FIG. 1. These drive signals are, for example, pulse signals that bring the NMOS transistor into a conductive (on) state at a high potential level and bring the NMOS transistor into a non-conductive (off) state at a low potential level.

The first photoelectric conversion section 1101*a* and the second photoelectric conversion section 1101*b* are, for example, PN-junction photodiodes. Each of the first photoelectric conversion section 1101*a* and the second photoelectric conversion section 1101*b* generates and accumulates a charge corresponding to the amount of received light. In the present example, the area of the light receiving surface of the first photoelectric conversion section 1101*a* is configured to be larger than the area of the light receiving surface of the second photoelectric conversion section 1101*b*, and thus, the first photoelectric conversion section 1101*a* is configured to cope with higher sensitivity than the second photoelectric conversion section 1101*b*. By using such two types of photodiodes having different sensitivities, the solid-state imaging device 1 can take a large dynamic range of the output voltage level of the pixel signal.

The first transfer gate section 1102*a* is an NMOS transistor provided between the first photoelectric conversion section 1101*a* and the first FD section 1105*a*. The drive signal TGL is applied to the gate electrode of the first transfer gate section 1102*a*. That is, when the drive signal TGL reaches a high potential level, the first transfer gate section 1102*a* enters a conductive state, and the charge accumulated in the first photoelectric conversion section 1101*a* is transferred to the first FD section 1105*a* via the first transfer gate section 1102*a*.

The second transfer gate section 1102*b* is an NMOS transistor provided between the charge accumulation section 1104 and the second FD section 1105*b*. The drive signal FCG is applied to the gate electrode of the second transfer gate section 1102*b*. When the drive signal FCG reaches a high potential level, the second transfer gate section 1102*b* enters a conductive state, and the potential of the charge accumulation section 1104 and the potential of the second FD section 1105*b* are coupled.

The third transfer gate section 1102*c* is an NMOS transistor provided between the first FD section 1105*a* and the second FD section 1105*b*. The drive signal FDG is applied to the gate electrode of the third transfer gate section 1102*c*. When the drive signal FDG reaches a high potential level, the third transfer gate section 1102*c* enters a conductive state, and the potential of the first FD section 1105*a* and the potential of the second FD section 1105*b* are coupled.

The reset gate section 1103 is an NMOS transistor provided between the power supply voltage VDD and the second FD section 1105*b*. The drive signal RST is applied to the gate electrode of the reset gate section 1103. When the drive signal RST reaches a high potential level, the reset gate section 1103 enters a conductive state. As a result, according to the potential levels of the drive signals FCG and FDG, the potential of the region where the first FD section 1105*a* and the second FD section 1105*b* are coupled, the potential of the region where the charge accumulation section 1104 and the second FD section 1105*b* are coupled, or the potential of the region where the charge accumulation section 1104, the first FD section 1105*a*, and the second FD section 1105*b* are coupled is reset to the level of the power supply voltage VDD.

The charge accumulation section 1104 includes a capacitor. The charge accumulation section 1104 may be formed by, for example, a diffusion layer and a gate electrode in silicon (Si), or may be formed by a metal/insulator/metal (MIM) structure. One electrode of the charge accumulation section 1104 is connected to the power supply voltage VDD, and the other electrode is connected to the cathode electrode of the second photoelectric conversion section 1101*b* and the drain electrode of the second transfer gate section 1102*b*. The charge accumulation section 1104 accumulates the charge photoelectrically converted by the second photoelectric conversion section 1101*b*.

The first FD section 1105a is a floating diffusion region capable of holding a predetermined charge amount. One electrode of the first FD section 1105a is installed, and the other electrode is connected to each of the drain electrode of the first transfer gate section 1102a, the source electrode of the third transfer gate section 1102c, and the gate electrode of the amplification transistor 1106. The charge accumulated in the first FD section 1105a is read out by being subjected to charge-voltage conversion into a voltage signal.

The second FD section 1105b is also a floating diffusion region capable of holding a predetermined charge amount. In the present embodiment, the charges accumulated in the second FD section 1105b are overflowed charges among the charges photoelectrically converted by the first photoelectric conversion section 1101a. One electrode of the second FD section 1105b is connected to the power supply SubFD-VDD, and the other electrode is connected to each of the source electrode of the second transfer gate section 1102b, the drain electrode of the third transfer gate section 1102c, and the source electrode of the reset gate section 1103. The charge accumulated in the second FD section 1105b is read out by being subjected to charge-voltage conversion into a voltage signal.

The amplification transistor 1106 is an NMOS transistor having the gate electrode connected to the first FD section 1105a and the drain electrode connected to the power supply voltage VDD. The amplification transistor 1106 serves as an input section of a reading circuit for reading the charge held in the first FD section 1105a, that is, a source follower circuit. That is, the amplification transistor 1106 has the source electrode connected to the vertical signal line 19 via the selection transistor 1107, thereby forming a source follower circuit with a constant current source 1108 connected to the vertical signal line 19.

The selection transistor 1107 is an NMOS transistor provided between the source electrode of the amplification transistor 1106 and the vertical signal line 19. The drive signal SEL is applied to the gate electrode of the selection transistor 1107. When the drive signal SEL reaches a high potential level, the selection transistor 1107 enters a conductive state, and the unit pixel 110 enters a selected state. As a result, the pixel signal output from the amplification transistor 1106 is read out to the vertical signal line 19 via the selection transistor 1107.

FIG. 4 is a diagram depicting an example of a circuit configuration of a base signal generation circuit in the solid-state imaging device according to an embodiment of the present technology. More specifically, (a) of the drawing is a circuit diagram depicting the base signal generation circuit 112 configured as a so-called sunspot circuit, and (a) of the drawing is a circuit diagram depicting the base signal generation circuit 112 using dummy pixels.

As depicted in (a) of the drawing, the base signal generation circuit 112 as a sunspot circuit is a source follower circuit including an amplification transistor 1121 and a selection transistor 1122. The drain electrode of the amplification transistor 1121 is connected to the power supply voltage VDD, and a base signal REF having a predetermined voltage is input to the gate electrode. In addition, the source electrode of the selection transistor 1122 is connected to the vertical signal line 19, and the selection signal SEL_R is input to the gate electrode. With this configuration, as will be described later, the base signal generation circuit 112 outputs a base signal for initializing the operating voltage of the comparator 1322 before the pixel signal is read from the unit pixel 110.

In addition, the example depicted in (b) of the drawing is a base signal generation circuit 112 configured using dummy pixels. The dummy pixel always outputs a dark level signal due to shielding of the light receiving surface. Since the dummy pixel has the same configuration as the circuit of the unit pixel 110 depicted in FIG. 3, the description thereof will be omitted. In the dummy pixel, since the photoelectrically converted charge does not flow into the first FD section 1105a due to overflow, there is no potential fluctuation, and a stable base signal can be obtained. In addition, since the pixel array section 11 is generally provided with a dummy pixel, it is not necessary to provide a new circuit by diverting the dummy pixel.

As another example, a specific unit pixel 110 may function as the base signal generation circuit 112. For example, an output (pixel signal) from the unit pixel 110 of an adjacent or neighboring pixel column in which reading of a pixel signal has already been performed immediately before and which is in a reset state may be used as a base signal for the unit pixel 110 from which reading is to be performed. In this case, since the unit pixel 110 selected for reading the pixel signal and the unit pixel 110 adjacent thereto (or in the vicinity thereof) are positioned in the vicinity of the pixel coordinates in the pixel array section 11, it is possible to ignore the drop of the power supply voltage VDD and the influence of the resistance value of the vertical signal line 19. Note that one or more columns may be separated from the adjacent pixel columns.

As described above, in a case where the dummy pixel or the adjacent unit pixel 110 is used as the base signal generation circuit 112, a signal read while the drive signal RST supplied to the reset gate section 1103 and the drive signal FDG supplied to the third transfer gate section 1102c are fixed to a high potential level is used as the base signal. As a result, even if the photoelectrically converted charge flows into the first FD section 1105a due to overflow, it is possible to avoid potential fluctuation and obtain a stable base signal.

As another example, a signal read after the drive signal RST supplied to the reset gate section 1103 and the drive signal FDG supplied to the third transfer gate section 1102c change from the high potential level to the low potential level may be used as the base signal. As described above, the reading of the base signal can be implemented by the same control as the normal reading of the pixel signal, and the control does not become complicated. In addition, since the potential of the first FD section 1105a and the potential of the second FD section 1105b are coupled, the fluctuating potentials can be equalized.

Figure 5:
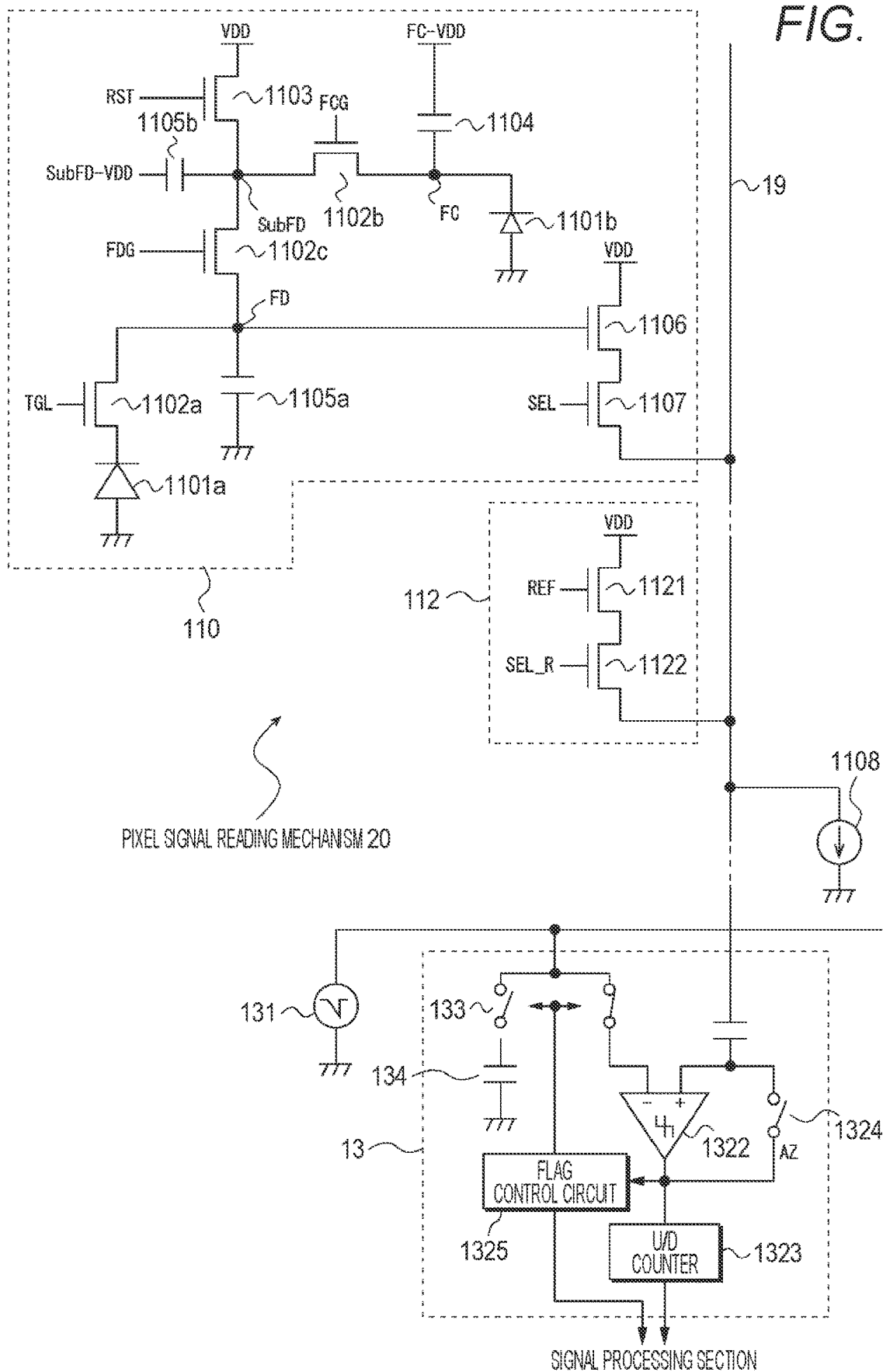
FIG. 5 is a diagram depicting an example of a circuit configuration of a pixel signal reading mechanism in the solid-state imaging device according to an embodiment of the present technology.

FIG. 5 is a diagram depicting an example of a circuit configuration of a pixel signal reading mechanism in the solid-state imaging device according to an embodiment of the present technology. Specifically, the drawing depicts a circuit configuration of the column processing section 13 in addition to the circuit configurations depicted in FIGS. 3 and 4(a).

As depicted in the drawing, the AD converter 132 includes, for example, a comparator 1322, a U/D counter 1323, an AZ switch 1324, and a flag control circuit 1325.

The comparator 1322 compares the pixel signal read from the unit pixel 110 with the reference signal output from the reference signal generation circuit 131, and outputs a signal (hereinafter, referred to as a "comparison result signal") according to the comparison result. For example, while the voltage level of the pixel signal read from the unit pixel 110 is lower than the voltage level of the reference signal, the comparator 1322 continues to output the comparison result signal at a low potential level, and thereafter, inverts and outputs the comparison result signal at a high potential level when the voltage level of the pixel signal read from the unit pixel 110 becomes higher than the voltage level of the reference signal. The comparison result signal based on the pixel signal and the reference signal is output to the U/D counter 1323 and the flag control circuit 1325.

Note that, as described later, in the present embodiment, the comparator 1322 is also used to determine whether the pixel signal corresponds to dark light or bright light in the determination phase.

The U/D counter 1323 performs counting on the input signal according to a predetermined clock for each readout period of the pixel signal, and outputs the counted value. For example, in the P-phase in which the unit pixel 110 is at the reset voltage level, the U/D counter 1323 performs down counting to hold the count value, and thereafter, in the D-phase in which the unit pixel 110 is at the signal voltage level, the U/D counter 1323 performs up counting, thereby outputting the final count value to the signal processing section 16 as a pixel signal in a digital format. Note that, instead of the U/D counter 1223, a gray code counter may be used.

The AZ switch 1324 controls the supply of an auto zero signal AZ for initializing the operation of the comparator 1322. That is, the AZ switch 1324 is switched to the conductive (on) state in a state where the base signal is output from the base signal generation circuit 112, whereby the output of the comparator 1322 to its input becomes zero, and the comparator 1322 is initialized according to the base signal. In a case where the operation and stop of the AD converter 132 are performed for each pixel column, the power consumption may fluctuate depending on the number of the AD converters 132 to be operated. Therefore, in the present embodiment, in order to prevent the change in the image quality due to the fluctuation in the power consumption, the operating state of the comparator 1322 is aligned by using the auto zero signal AZ.

The flag control circuit 1325 holds a flag according to the comparison result signal output from the comparator 1322 in the determination phase. In the present example, the flag indicates either the high sensitivity mode or the low sensitivity mode. In addition, the flag control circuit 1325 performs control to switch the output destination of the output control circuit 133 while the pixel signal is read following the determination phase according to either the high sensitivity mode or the low sensitivity mode. That is, the pixel signal reading mechanism 20 operates in the high sensitivity mode or the low sensitivity mode according to the flag. In the high sensitivity mode, a pixel signal corresponding to dark light among the read pixel signals is subjected to AD conversion processing, and in the low sensitivity mode, a pixel signal corresponding to bright light among the read pixel signals is subjected to AD conversion processing.

FIG. 6 is a diagram for explaining an example of a schematic operation of the pixel signal reading mechanism in the solid-state imaging device according to an embodiment of the present technology. Note that an example of a more detailed operation of the pixel signal reading mechanism 20 will be described with reference to FIGS. 8 and 9.

As depicted in the drawing, the above-described pixel signal reading mechanism 20 is controlled to operate in the determination mode in the head phase of the readout period of the pixel signal, that is, the determination phase. That is, in the determination mode, the pixel signal reading mechanism 20 first reads the base signal from the base signal generation circuit 112 at time TJ1 as the P-phase, initializes the comparator 1322 with the auto zero signal according to the read base signal, then reads the pixel signal SP1 based on the charge amount in the predetermined floating diffusion region in the unit pixel 110 at time TJ2 as the D-phase, and compares the voltage level of the read pixel signal with the voltage level of the reference signal to determine whether the read pixel signal is a pixel signal corresponding to dark light or a pixel signal corresponding to bright light. Note that, in the present example, the pixel signal SP1 corresponds to a D-phase pixel signal SP1L to be described later. As another example, the pixel signal SP1 may be a pixel signal based on the amount of charges overflowing from the first photoelectric conversion section 1101a during the exposure period.

In a case of determining that the voltage level of the read pixel signal does not exceed the voltage level of the reference signal, the pixel signal reading mechanism 20 assumes that the charge in the predetermined floating diffusion region does not overflow, and is controlled to operate in the high sensitivity mode. Meanwhile, in a case of determining that the voltage level of the read pixel signal exceeds the voltage level of the reference signal, the pixel signal reading mechanism 20 assumes that the charge in the predetermined floating diffusion region overflows, and is controlled to operate in the low sensitivity mode.

In the high sensitivity mode, the pixel signal reading mechanism 20 performs the AD conversion processing on the basis of the pixel signal SP1 sequentially read in time at each of the times T1 to T4. That is, in the high sensitivity mode, the pixel signal reading mechanism 20 gives an enable signal to the AD converter 132 in the first half phase of the readout period of the pixel signal, and performs the AD conversion processing using the pixel signals SP1H and SP1L based on the charges photoelectrically converted by the first photoelectric conversion section 1101a. Note that, in the present example, each of the pixel signals SP1H and SP1L includes a P-phase signal or a D-phase signal.

Meanwhile, in the low sensitivity mode, the pixel signal reading mechanism 20 performs the AD conversion processing on the basis of the pixel signals SP1 and SP2 sequentially read in time at each of the times T5 to T8. That is, in the low sensitivity mode, the pixel signal reading mechanism 20 gives an enable signal to the AD converter 132 in the latter half phase of the readout period of the pixel signal, and performs the AD conversion processing on the basis of the pixel signal SP1 based on the charge photoelectrically converted by the first photoelectric conversion section 1101a and the pixel signal SP2 based on the charge photoelectrically converted by the second photoelectric conversion section 1101b. Note that, in the present example, the pixel signal SP2 is similarly configured by P-phase or D-phase signals.

Figure 7:
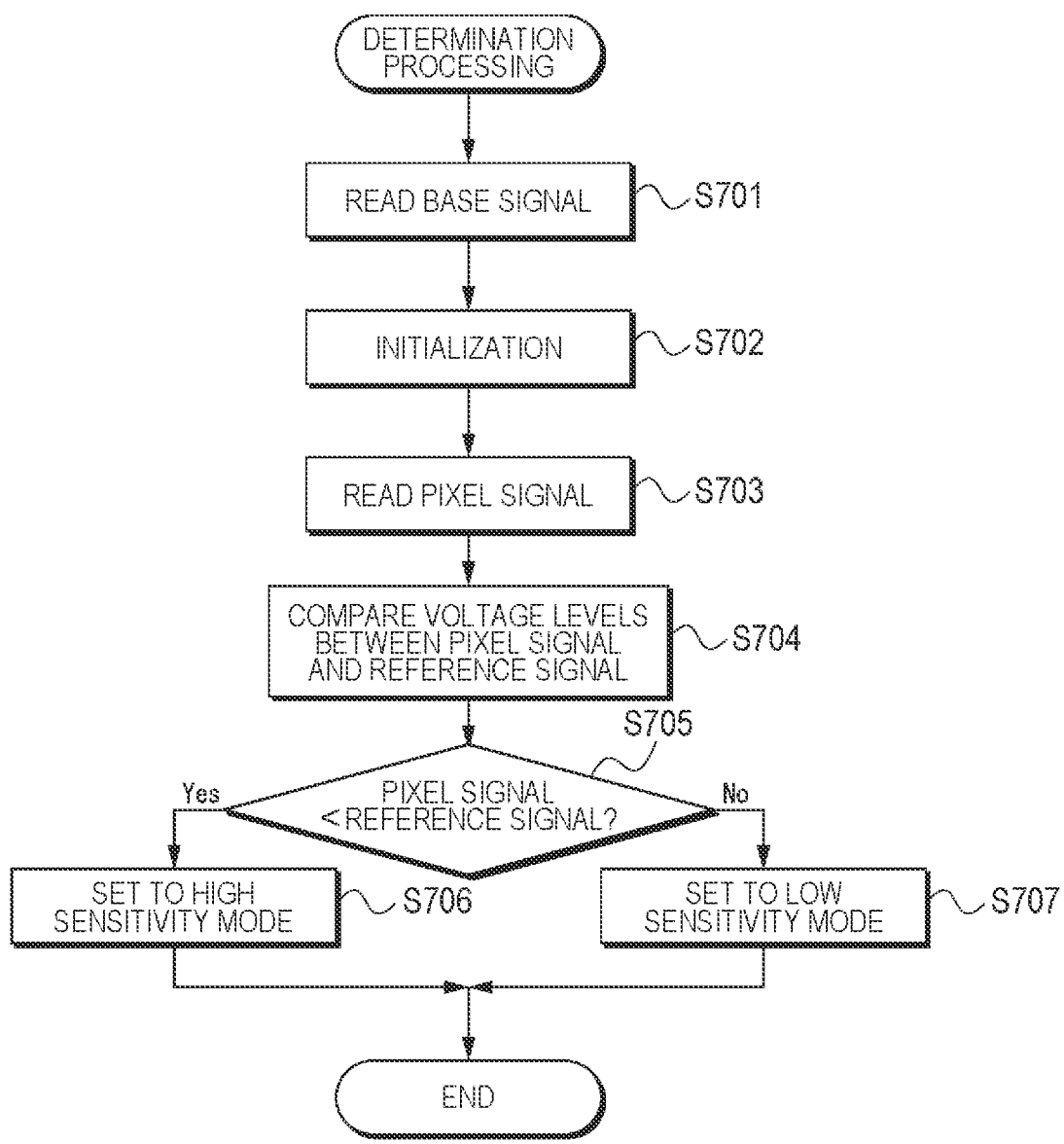
FIG. 7 is a flowchart depicting an example of determination processing by the pixel signal reading mechanism in the solid-state imaging device according to an embodiment of the present technology.

FIG. 7 is a flowchart depicting an example of determination processing by the pixel signal reading mechanism in the solid-state imaging device according to an embodiment of the present technology.

As depicted in the drawing, in the pixel signal reading mechanism 20, the drive signal SEL_R is applied to the gate electrode of the selection transistor 1122 of the base signal generation circuit 112, and the selection transistor 1122 enters a conductive state, so that the base signal of a predetermined voltage level is read out to the vertical signal line 19 (S701).

While the base signal is being read, the AZ switch 1324 is controlled to be turned on to be in a conductive state, and the auto zero signal AZ causes the comparator 1322 to have an output of zero with respect to its input.

As a result, the comparator 1322 is initialized based on the base signal (S702). Therefore, the potential level of the AD converter 132 for each pixel column is aligned, and variations in image quality due to variations in power consumption caused by the AD converter 132 operating and stopping for each pixel column can be suppressed. After the initialization, the AZ switch 1324 is turned off to be in a non-conductive state, the application of the drive signal SEL_R is stopped, the selection transistor 1122 enters a non-conductive state, and the reading of the base signal is stopped.

Next, the drive signal SEL is applied to the gate electrode of the selection transistor 1107 of the unit pixel 110, and a pixel signal based on the potential of a predetermined floating diffusion region (in the present example, the first FD section 1105a and the second FD section 1105b) is read out to the vertical signal line 19 (S703). That is, among the charges photoelectrically converted by the first photoelectric conversion section 1101a, a pixel signal based on the charge flowing into a predetermined floating diffusion region due to overflow is read out.

Subsequently, the comparator 1322 starts comparing the pixel signal read from the unit pixel 110 with the reference signal output from the reference signal generation circuit 131, and determines whether or not the voltage level of the pixel signal is higher than the voltage level of the reference signal (S704). In the present example, the gradient signal is used as the reference signal, and the voltage waveform of the reference signal is set such that the voltage level of the reference signal is higher than the voltage level of the pixel signal at least until the gradual decrease in the voltage level of the reference signal is settled. The comparator 1322 outputs a comparison result signal corresponding to the level between the voltage level of the pixel signal and the voltage level of the reference signal to the flag control circuit 1325. Note that, immediately after the start of the comparison, the comparator 1322 outputs a comparison result signal at a low potential level.

In a case where the voltage level of the pixel signal is lower than the voltage level of the reference signal at the time point the voltage level of the reference signal becomes minimum (Yes in S705), the comparator 1322 keeps outputting the comparison result signal at the low potential level, and the flag control circuit 1325 sets and holds the flag indicating the high sensitivity mode (S706). That is, this means that the amount of charge flowing into the predetermined floating diffusion region due to the overflow is small, and the pixel signal corresponding to the dark light is processed. On the other hand, in a case where the voltage level of the pixel signal is not lower than the voltage level of the reference signal (No in S705), since the comparator 1322 inverts and outputs the comparison result signal at the high potential level, the flag control circuit 1325 sets and holds a flag indicating the low sensitivity mode (S707). That is, this means that the amount of charges flowing into the predetermined floating diffusion region due to the overflow is large, and the pixel signal corresponding to the bright light is processed.

Then, in the readout period of the pixel signal, the flag control circuit 1325 selectively switches the output control circuit 133 according to the held flag, whereby the operation and stop of the AD converter 132 are controlled.

By the above operation, the pixel signal reading mechanism 20 can determine whether the unit pixel 110 receives dark light or bright light according to the result of comparison between the voltage levels of the base signal and the pixel signal.

Figure 8:
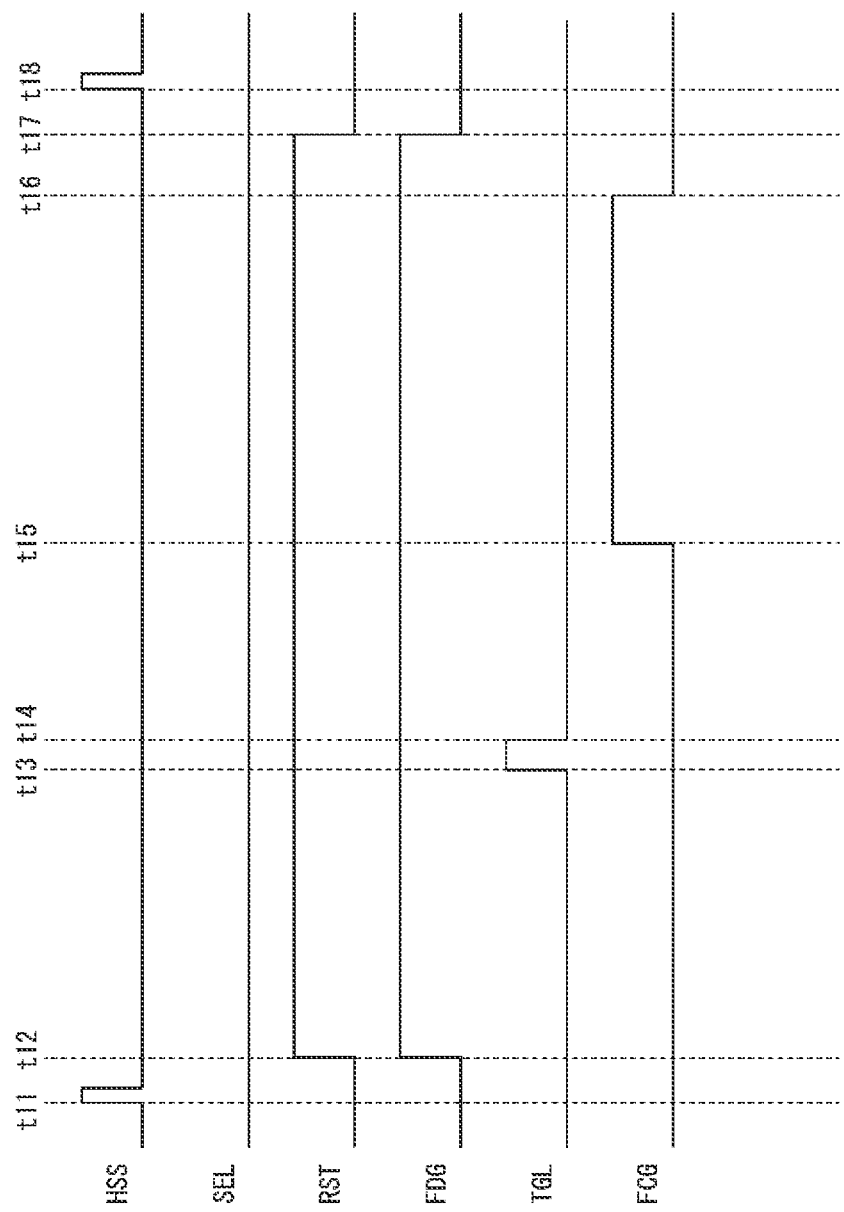
FIG. 8 is a timing chart depicting an example of operation of unit pixels in the pixel array section of the solid-state imaging device according to an embodiment of the present technology.

FIG. 8 is a timing chart depicting an example of the operation of the unit pixel in the pixel array section of the solid-state imaging device according to an embodiment of the present technology, and specifically, is a timing chart depicting an example of processing related to exposure (light reception) by each unit pixel 110. The drawing depicts a timing chart of the horizontal synchronization signal HSS, the drive signals SEL, RST, FDG, TGL, and FCG (see FIG. 3). Under the control of the system control section 15, for example, the operation is performed in a predetermined scanning order for each pixel row or each of a plurality of pixel rows of the pixel array section 11.

As depicted in the drawing, first, at time t11, the horizontal synchronization signal HSS is input, and processing related to a series of exposures in the unit pixel 110 is started.

Next, at time t12, the drive signals RST and FDG reach high potential levels, and the reset gate section 1103 and the third transfer gate section 1102c enter conductive states. As a result, the first FD section 1105a and the second FD section 1105b are coupled, and the potential of the coupled region is reset to the level of the power supply voltage VDD.

Next, at time t13, the drive signal TGL reaches a high potential level, and the first transfer gate section 1102a enters a conductive state. As a result, the charge accumulated in the first photoelectric conversion section 1101a is transferred to the first FD section 1105a and the second FD section 1105b via the first transfer gate section 1102a, and the first photoelectric conversion section 1101a is reset.

Next, at time t14, the drive signal TGL reaches a low potential level, and the first transfer gate section 1102a enters a non-conductive state. As a result, accumulation of charges in the first photoelectric conversion section 1101a is started.

Next, at time t15, the drive signal FCG reaches a high potential level, and the second transfer gate section 1102b enters a conductive state. As a result, the potential of the charge accumulation section 1104, the potential of the first FD section 1105a, and the potential of the second FD section 1105b are coupled. In addition, the charges accumulated in the second photoelectric conversion section 1101b are transferred to the coupled region, and the potential of the coupled region is reset to the level of the power supply voltage VDD.

Next, at time t16, the drive signal FCG reaches a low potential level, and the second transfer gate section 1102b enters a non-conductive state. As a result, the charge accumulation section 1104 starts to accumulate the charge transferred from the second photoelectric conversion section 1101b.

Next, at time t17, the drive signals RST and FDG reach low potential levels, and the reset gate section 1103 and the third transfer gate section 1102c enter non-conductive states.

Then, at time t18, the horizontal synchronization signal HSS is input. As a result, a series of processing related to exposures in the unit pixel 110 is completed.

Note that, in the series of the processing related to exposures, since the pixel signal is not read, the drive signal SEL remains at the low potential level.

Figure 9:
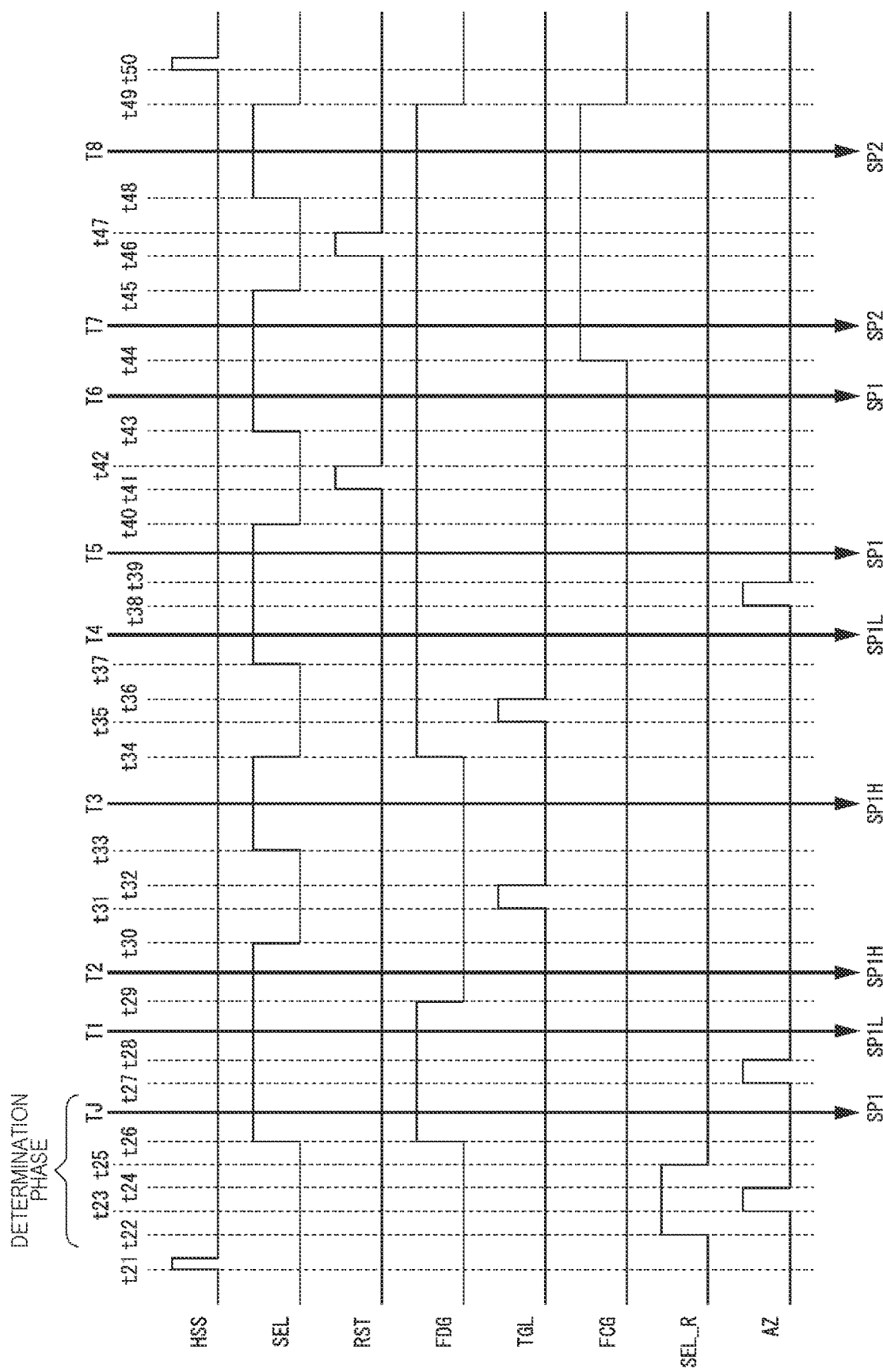
FIG. 9 is a timing chart for explaining an example of operation of the pixel signal reading mechanism of the solid-state imaging device according to an embodiment of the present technology.

FIG. 9 is a timing chart for explaining an example of the operation of the pixel signal reading mechanism of the solid-state imaging device according to an embodiment of the present technology, and specifically, is a timing chart depicting an example of the pixel signal reading processing from the unit pixel 110. The drawing depicts a timing chart of the horizontal synchronization signal HSS, the drive signals SEL, RST, FDG, TGL, and FCG for the unit pixel 110, the drive signal SEL_R for the base signal generation circuit 112, and the auto zero signal AZ for the comparator 1322. The processing is performed in a predetermined scanning order after a predetermined time from when the exposure processing depicted in FIG. 8 is performed, for example, for each pixel row or each of a plurality of pixel rows of the pixel array section 11.

Referring to the drawing, first, at time t21, the horizontal synchronization signal HSS is input, and the readout period of the unit pixel 110 starts. Note that, in the present embodiment, the head phase of the readout period is the determination phase.

Next, at time t22, the drive signal SEL_R of the base signal generation circuit 112 reaches a high potential level, and the selection transistor 1122 enters a conductive state. As a result, the base signal applied to the gate electrode of the amplification transistor 1121 is input to the comparator 1322 via the vertical signal line 19.

Subsequently, at time t23, the AZ switch 1324 is turned on, and the auto zero signal AZ causes the comparator 1322 to have an output of zero to its input, whereby the initialization of the comparator 1322 is started.

Thereafter, at time t24, the AZ switch 1324 is turned off, and subsequently, at time t25, the drive signal SEL_R reaches a low potential level, and the selection transistor 1122 enters a non-conductive state. As a result, the initialization of the comparator 1322 according to the base signal is completed.

Next, at time t26, the drive signal SEL reaches a high potential level, the selection transistor 1107 enters a conductive state, the drive signal FDG reaches a high potential level, and the third transfer gate section 1102c enters a conductive state. As a result, the pixel signal SP1 according to the potential SubFD of the second FD section 1105b is output to the vertical signal line 19. At this time, the voltage level of the reference signal to the comparator 1322 gradually decreases, and comparison between the pixel signal and the reference signal by the comparator 1322 is started.

In the comparison by the comparator 1322, in a case where the voltage level of the pixel signal SP1 is lower than the voltage level of the reference signal at the time point (time TJ) when the voltage level of the reference signal has dropped to the low potential level, the comparison result signal output by the comparator 1322 remains at the low potential level. This is because the amount of charge having overflowed through the first photoelectric conversion section 1101a in the exposure processing is small, and the AD converter 132 processes a pixel signal corresponding to dark light. In this case, the flag control circuit 1325 holds a flag indicating the high sensitivity mode.

Meanwhile, in a case where the voltage level of the pixel signal SP1 is higher than the voltage level of the reference signal, the comparison result signal output from the comparator 1322 is inverted to a high potential level. This is because the amount of charge having overflowed through the first photoelectric conversion section 1101a in the unit pixel 110 is large to some extent or sufficiently, and the AD converter 132 processes a pixel signal corresponding to bright light. In this case, the flag control circuit 1325 holds a flag indicating the low sensitivity mode.

As described above, the determination phase at the head of the pixel signal readout period by the pixel signal reading mechanism 20 ends. In the present embodiment, since the reset with respect to the potential of the specific floating diffusion region by the drive signal RST is not performed immediately after the exposure processing, the charge accumulated in the first photoelectric conversion section 1101a and overflowing the first transfer gate section 1102a indicates the initial state.

Next, from time t27 to time t28, the AZ switch 1324 is turned on, and the auto zero signal AZ causes the comparator 1322 to have an output of zero to its input, whereby the comparator 1322 is initialized according to the base signal. Therefore, the potential level of the AD converter 132 for each pixel column is aligned, and variations in image quality due to variations in power consumption caused by the AD converter 132 operating and stopping for each pixel column can be suppressed.

Next, at time T1, the pixel signal SP1L based on the potential SubFD due to the coupling between the first FD section 1105a and the second FD section 1105b is output to the vertical signal line 19 via the amplification transistor 1106 and the selection transistor 1107. Note that the pixel signal SP1L is a potential level in an initial state immediately after the start of reading, and is a P-phase pixel signal.

Next, at time t29, the drive signal FDG reaches a low potential level, and the third transfer gate section 1102c enters a non-conductive state. As a result, the potential coupling between the first FD section 1105a and the second FD section 1105b is released.

Next, at time T2, the pixel signal SP1H based on the potential FD of the first FD section 1105a is output to the vertical signal line 19 via the amplification transistor 106 and the selection transistor 1107. Note that the pixel signal SP1H is a D-phase pixel signal.

Next, at time t30, the drive signal SEL reaches a low potential level, and the selection transistor 1107 enters a non-conductive state. As a result, reading of the pixel signal from the unit pixel 110 is temporarily stopped.

Next, at time t31, the drive signal TGL reaches a high potential level, and the first transfer gate section 1102a enters a conductive state. As a result, the charge generated and accumulated in the first photoelectric conversion section 1101a during the exposure period is transferred to the first FD section 1105a via the first transfer gate section 102a.

Subsequently, at time t32, the drive signal TGL reaches a low potential level, and the first transfer gate section 1102a enters a non-conductive state. As a result, the transfer of the charge from the first photoelectric conversion section 1101a to the first FD section 1105a is stopped, and preparation for reading the pixel signal based on the charge of the first FD section 1105a is completed.

Next, at time t33, the drive signal SEL reaches a high potential level, and the selection transistor 1107 enters a conductive state.

Next, at time T3, the pixel signal SP1H based on the potential FD of the first FD section 1105a is output to the vertical signal line 19 via the amplification transistor 1106 and the selection transistor 1107. The pixel signal SP1H is a D-phase pixel signal for the P-phase pixel signal SPH1 read at time T2, which is generated by the first photoelectric conversion section 1101a during the exposure period and is based on the charge accumulated in the first FD section 1105a.

Next, at time t34, the drive signal SEL reaches a low potential level, the selection transistor 1107 enters a non-conductive state, the drive signal FDG reaches a high potential level, and the third transfer gate section 1102c enters a conductive state. As a result, reading of the pixel signal from the unit pixel 110 is temporarily stopped, and the potential of the first FD section 1105a and the potential of the second FD section 1105b are coupled.

Next, at time t35, the drive signal TGL reaches a high potential level, and the first transfer gate section 1102a enters a conductive state. As a result, the charge that has not been transferred from the first photoelectric conversion section 1101a between time t31 and time t32 is transferred to the region coupled with the first FD section 1105a and the second FD section 1105b via the first transfer gate section 102a.

Subsequently, at time t36, the drive signal TGL reaches a low potential level, and the first transfer gate section 1102a reaches a low potential level. As a result, the transfer of the remaining charge from the first photoelectric conversion section 1101a to the region where the first FD section 1105a and the second FD section 1105b are coupled is stopped.

Next, at time t37, the drive signal SEL reaches a high potential level, and the selection transistor 1107 enters a conductive state.

Next, at time T4, the pixel signal SP1L based on the potential SubFD level due to the coupling between the first FD section 1105a and the second FD section 1105b is output to the vertical signal line 19 via the amplification transistor 1106 and the selection transistor 1107. The pixel signal SP1L is a D-phase pixel signal for the P-phase pixel signal SP1L output at time T1.

Next, from time t38 to time t39, the AZ switch 1324 enters a conductive state, and the auto zero signal AZ causes the comparator 1322 to have an output of zero to its input, whereby the comparator 1322 is initialized according to the base signal. Therefore, the potential level of the AD converter 132 for each pixel column is aligned, and variations in image quality due to variations in power consumption caused by the AD converter 132 operating and stopping for each pixel column can be suppressed.

Subsequently, at time T5, the pixel signal SP1 based on the potential SubFD due to the coupling of the first FD section 1105a and the second FD section 1105b is output to the vertical signal line 19 via the amplification transistor 1106 and the selection transistor 1107. The pixel signal SP1 is a D-phase pixel signal for the P-phase pixel signal SP1 output at time T6 described later.

Next, at time t40, the drive signal SEL reaches a low potential level, and the selection transistor 1107 enters a non-conductive state.

Next, at time t41, the drive signal RST reaches a high potential level, and the reset gate section 1103 enters a conductive state. As a result, the potential of the region where the first FD section 1105a and the second FD section 1105b are coupled is reset to the level of the power supply voltage VDD.

Next, at time t42, the drive signal RST reaches a low potential level, and the reset gate section 1103 enters a non-conductive state.

Next, at time t43, the drive signal SEL reaches a high potential level, and the selection transistor 1107 enters a conductive state.

Subsequently, at time T6, the pixel signal SP1 based on the potential SubFD due to the coupling of the first FD section 1105aD and the second FD section 1105b is output to the vertical signal line 19 via the amplification transistor 1106 and the selection transistor 1107. The pixel signal SP1 is a P-phase pixel signal for the D-phase pixel signal SP1 output at time T5.

Next, at time t44, the drive signal FCG reaches a high potential level, and the second transfer gate section 1102b enters a conductive state. As a result, the potential of the first FD section 1105a, the potential of the second FD section 1105b, and the potential of the charge accumulation section 1104 are coupled.

Subsequently, at time T7, the pixel signal SP2 based on the potential FC due to the coupling of the first FD section 1105a, the second FD section 1105b, and the charge accumulation section 1104 is output to the vertical signal line 19 via the amplification transistor 1106 and the selection transistor 1107. The pixel signal SP2 is a D-phase pixel signal corresponding to bright light including charges accumulated in the second photoelectric conversion section 1101b.

Next, at time t45, the drive signal SEL reaches a low potential level, and the selection transistor 1107 enters a non-conductive state.

Next, at time t46, the drive signal RST reaches a high potential level, and the reset gate section 1103 enters a conductive state. As a result, the potential of the region where the first FD section 1105a, the second FD section 1105b, and the charge accumulation section 1104 are coupled is reset to the level of the power supply voltage VDD.

Next, at time t47, the drive signal RST reaches a low potential level, and the reset gate section 1103 enters a non-conductive state.

Next, at time t48, the drive signal SEL reaches a high potential level, and the selection transistor 1107 enters a conductive state.

Subsequently, at time T8, the pixel signal SP2 based on the potential FC due to the coupling of the first FD section 1105a, the second FD section 1105b, and the charge accumulation section 1104 is output to the vertical signal line 19 via the amplification transistor 1106 and the selection transistor 1107. The pixel signal SP2 is a P-phase pixel signal for the D-phase pixel signal SP2 output at time T7.

Next, at time t49, the drive signal SEL reaches a low potential level, the selection transistor 1107 enters a non-conductive state, the drive signals FCG and FDG reach low potential levels, and each of the second transfer gate section 1102b and the third transfer gate section 1102c enter non-conductive states.

Then, at time t50, the horizontal synchronization signal HSS is input. As a result, a series of pixel signal reading processing in the unit pixel 110 is completed. Note that the unit pixel 110 from which the pixel signal has been read enters a reset state.

As described above, the pixel signal reading mechanism 20 of the present embodiment can operate in the determination mode at the head of the readout period of the pixel signal after the exposure processing, read the pixel signal based on the charge amount in the predetermined floating diffusion region, determine the voltage level of the pixel signal, and selectively control the processing on the pixel signal to be subsequently read according to the result of the determination. In particular, the pixel signal reading mechanism 20 of the present embodiment operates in the high sensitivity mode in a case where the voltage level of the pixel signal is lower than the voltage level of the reference signal, and operates in the low sensitivity mode in a case where the voltage level of the pixel signal is higher than the voltage level of the reference signal. Therefore, the operation time of the AD converter 132 in the readout period of the pixel signal is substantially half, and power consumption can be reduced.

2. Second Embodiment

The present embodiment is a modification of the first embodiment, and is characterized in that, for a pixel signal read in a determination phase after exposure (light reception) processing is read, a pixel signal based on a charge amount in a floating diffusion region different from that of the first embodiment is read, a voltage level of the pixel signal is determined, and processing on a pixel signal to be subsequently read is selectively controlled according to a result of the determination.

That is, the pixel signal reading mechanism 20 of the present embodiment does not read the pixel signal based on the potential SubFD of the region where the first FD section 1105a and the second FD section 1105b are coupled, but reads the pixel signal based on the potential FD of the first FD section 1105a.

Figure 10:
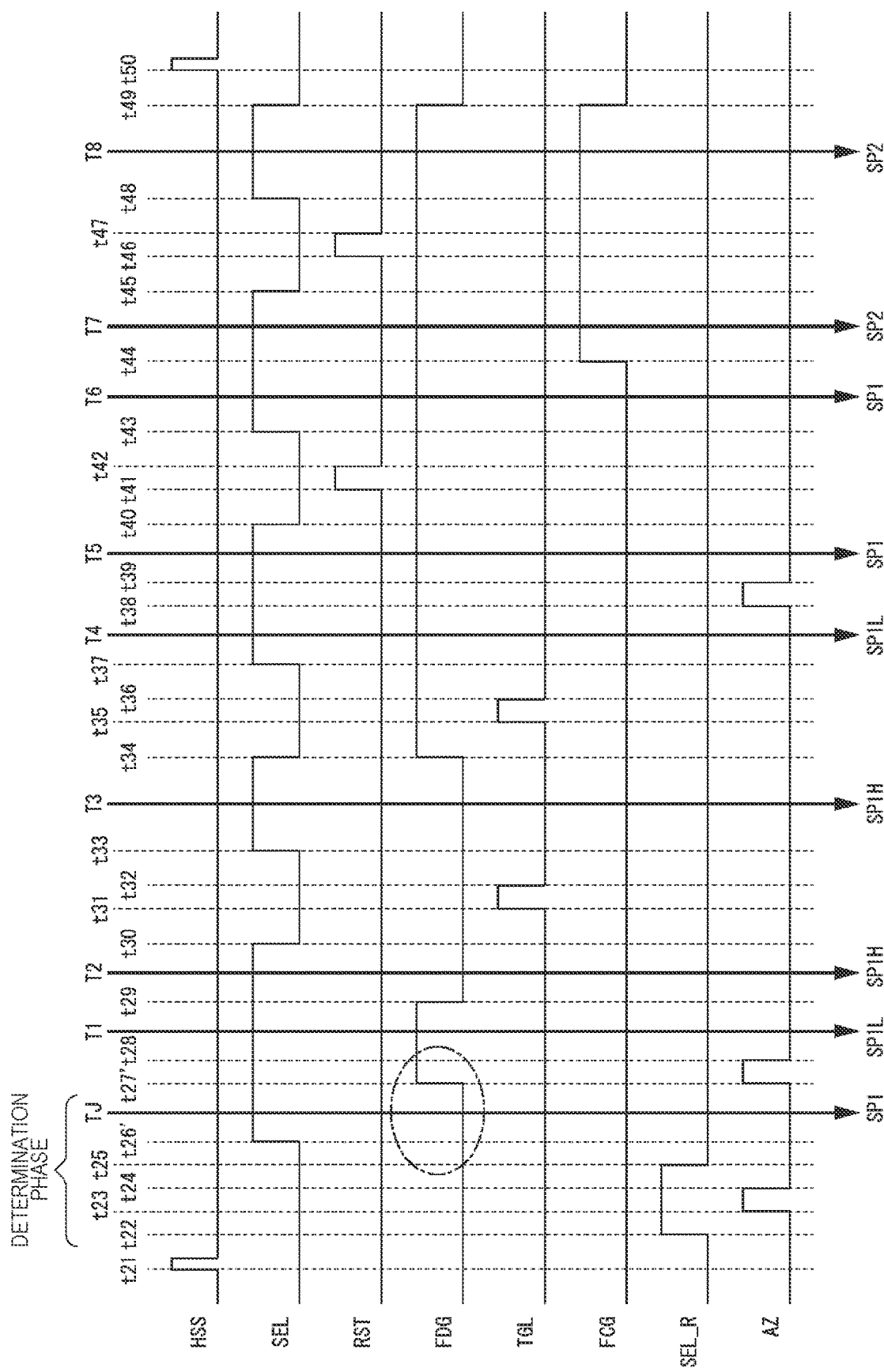
FIG. 10 is a timing chart for explaining an example of operation of the pixel signal reading mechanism of the solid-state imaging device according to an embodiment of the present technology.

FIG. 10 is a timing chart for explaining an example of operation of the pixel signal reading mechanism of the solid-state imaging device according to an embodiment of the present technology. Note that the timing chart depicted in the drawing is the same as the timing chart depicted in FIG. 9 except for the operations at times t26' to t27' (in the drawing, it is indicated by a one-dot chain line).

Referring to the drawing, the horizontal synchronization signal HSS is input at time t21, the readout period of the unit pixel 110 starts, and the comparator 1322 is initialized according to the base signal at times t22 to t5 as described above.

Next, at time t26', the drive signal SEL reaches a high potential level, and the selection transistor 1107 enters a conductive state. At this time, unlike the first embodiment, the drive signal FDG remains at a low potential level, and the third transfer gate section 1102c is in a non-conductive state. Therefore, a pixel signal according to the potential FD of the second FD section 1105b is output to the vertical signal line 19. As a result, as described above, comparison between the pixel signal and the reference signal by the comparator 1322 is started.

In the comparison by the comparator 1322, in a case where the voltage level of the pixel signal is lower than the voltage level of the reference signal at the time point (time TJ) when the voltage level of the reference signal has dropped to the low potential level, the comparison result signal output by the comparator 1322 remains at the low potential level. This is because the amount of charge having overflowed through the first photoelectric conversion section 1101a in the exposure processing is small, and the AD converter 132 processes a pixel signal corresponding to dark light. In this case, the flag control circuit 1325 holds a flag indicating the high sensitivity mode.

Next, at time t27', the drive signal FDG reaches a high potential level, and the third transfer gate section 1102c enters a conductive state. As a result, the potential of the first FD section 1105a and the potential of the second FD section 1105b are coupled, and a pixel signal according to the potential SubFD of the coupled region is output to the vertical signal line 19. At this time, the voltage level of the reference signal to the comparator 1322 gradually decreases, and comparison between the pixel signal and the reference signal by the comparator 1322 is started.

In addition, from time t27' to time t28, the AZ switch 1324 is turned on, and the auto zero signal AZ causes the comparator 1322 to have an output of zero to its input, whereby the comparator 1322 is initialized according to the base signal.

Note that subsequent operations in the pixel signal reading mechanism 20 are the same as those in the first embodiment, and thus description thereof will be omitted.

As described above, according to the present embodiment, advantages similar to those of the first embodiment can be obtained. In particular, according to the present embodiment, in the determination phase, since the selection transistor 1107 enters a conductive state while the third transfer gate section 1102c is kept in a non-conductive state, it is possible to read the pixel signal based on the charge photoelectrically converted by the first photoelectric conversion section 1101a and overflowed and accumulated in the first FD section 1105a, and it is possible to similarly determine whether the unit pixel 110 receives bright light or dark light on the basis of such a pixel signal.

3. Third Embodiment

The present embodiment is a modification of the first embodiment, and is characterized by determining whether a unit pixel receives bright light or dark light according to the presence or absence of a current flowing in a base signal generation circuit. That is, in the present embodiment, the pixel signal reading mechanism makes outputs of two source follower circuits compete with each other in a determination phase, and performs the brightness/darkness determination of the light received by the unit pixel according to the presence or absence of the current flowing through one source follower circuit.

Figure 11:
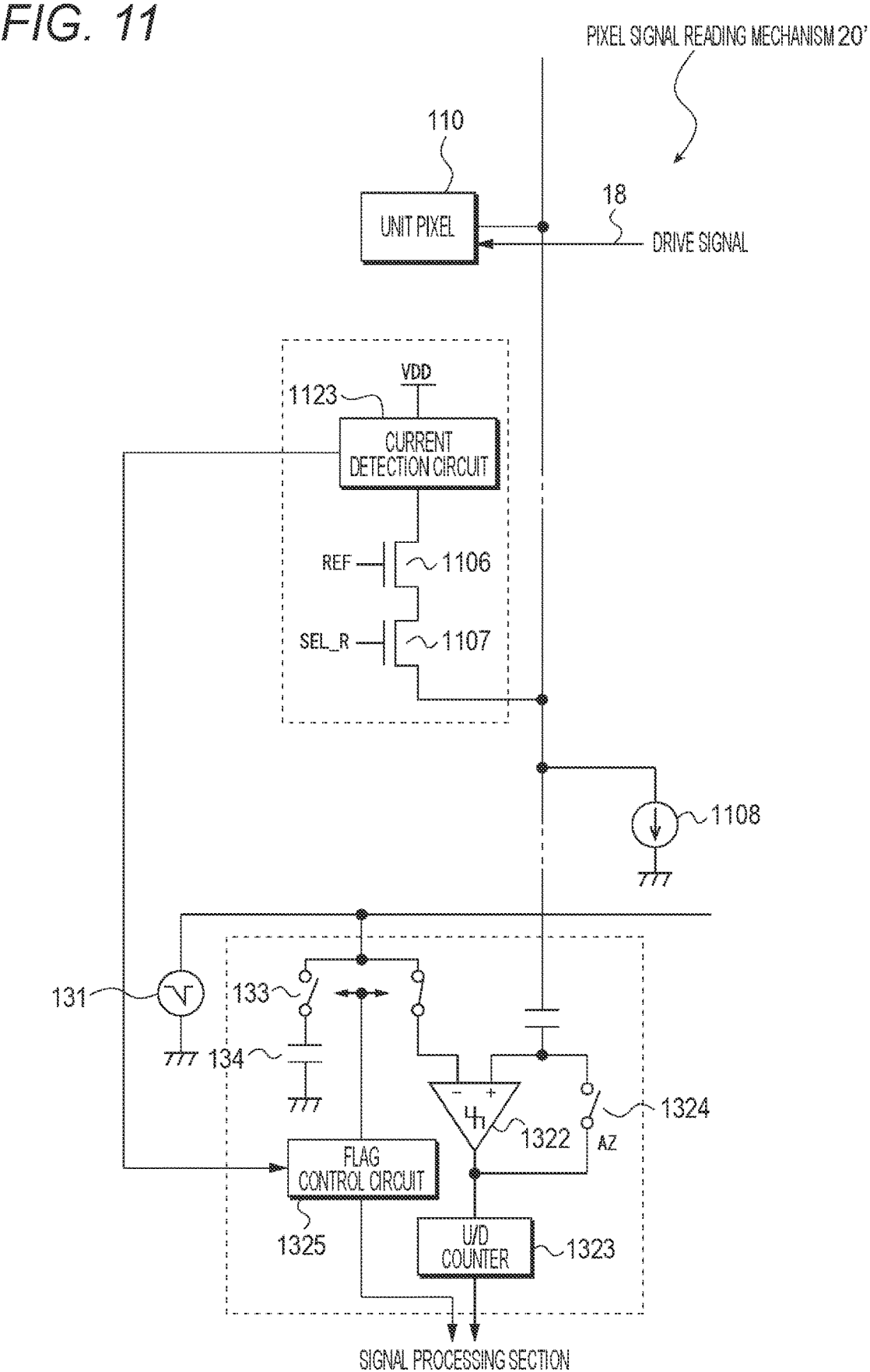
FIG. 11 is a diagram for explaining an example of the pixel signal reading mechanism in the solid-state imaging device according to an embodiment of the present technology.

FIG. 11 is a diagram for explaining an example of the pixel signal reading mechanism in the solid-state imaging device according to an embodiment of the present technology. As depicted in the drawing, the pixel signal reading mechanism 20' of the present embodiment is different from the pixel signal reading mechanism 20 depicted in FIG. 2 in that the base signal generation circuit 112 includes a current detection circuit 1123. Note that, in the drawing, the circuit configuration of the unit pixel 110 is the same as that depicted in FIG. 2, and thus is omitted.

That is, as depicted in the drawing, the base signal generation circuit 112 includes the current detection circuit 1123 provided between the domain electrode of the amplification transistor 1121 and the power supply voltage VDD. In a case where a current flows through the domain electrode of the amplification transistor 1121, the current detection circuit 1123 outputs a detection signal based on the current to the flag control circuit 1325 of the column processing section 13.

In addition, similarly to the first embodiment, the pixel signal reading mechanism 20' includes a source follower circuit of the amplification transistor 1106 of the unit pixel 110 and a source follower circuit of the amplification transistor 1121 of the base signal generation circuit 112.

The pixel signal reading mechanism 20' configured as described above operates as follows in a determination phase after exposure processing.

That is, when the drive signal SEL is applied to the gate electrode of the selection transistor 1107 of the unit pixel 110 and the drive signal SEL_R for the selection transistor 1122 of the base signal generation circuit 112 is applied, the selection transistor 1107 and the selection transistor 1122 enter conductive states. As a result, the pixel signal is output from the predetermined floating diffusion region of the unit pixel 110 to the vertical signal line 19, and the base signal is also output from the base signal generation circuit 112 to the vertical signal line 19. As a result, the voltage of the pixel signal and the voltage of the base signal compete with each other, and the current flows only in the source follower circuit having the higher input voltage. Therefore, when the voltage level of the pixel signal is higher than the voltage level of the base signal, a current flows through the unit pixel 110, and no current flows through the base signal generation circuit 112. On the other hand, when the voltage level of the pixel signal is lower than the voltage level of the base signal, a current flows through the base signal generation circuit 112. Therefore, in a case of detecting the current flowing on the basis of the difference between the input voltages of the source follower circuits, the current detection circuit 1123 outputs a detection signal based on the current to the flag control circuit 1325.

The flag control circuit 1325 holds a flag according to the detection signal output from the current detection circuit 1123. That is, in a case of receiving the detection signal from the current detection circuit 1123 (that is, in a case where the detected signal indicates a high potential level), the flag control circuit 1325 holds the flag indicating the high sensitivity mode. Meanwhile, in a case of not receiving the detection signal from the current detection circuit 1123 (that is, in a case where the detected signal indicates a low potential level), the flag control circuit 1325 holds the flag indicating the low sensitivity mode. The flag control circuit 1325 performs control to switch the output destination of the output control circuit 133 according to either the high sensitivity mode or the low sensitivity mode.

As described above, according to the present embodiment, advantages similar to those of the first embodiment are obtained. In addition, according to the present embodiment, it is possible to easily determine the potential level of the pixel signal by using the characteristic by the combination of the two source follower circuits.

4. Fourth Embodiment

The present embodiment is a modification of the first embodiment, and is characterized in that in a pixel signal reading mechanism configured to be able to read different pixel signals from a unit pixel in parallel via two systems of vertical signal lines (VSL), processing is performed only on a pixel signal read from one vertical signal line according to a determination result in a determination phase.

Figure 12:
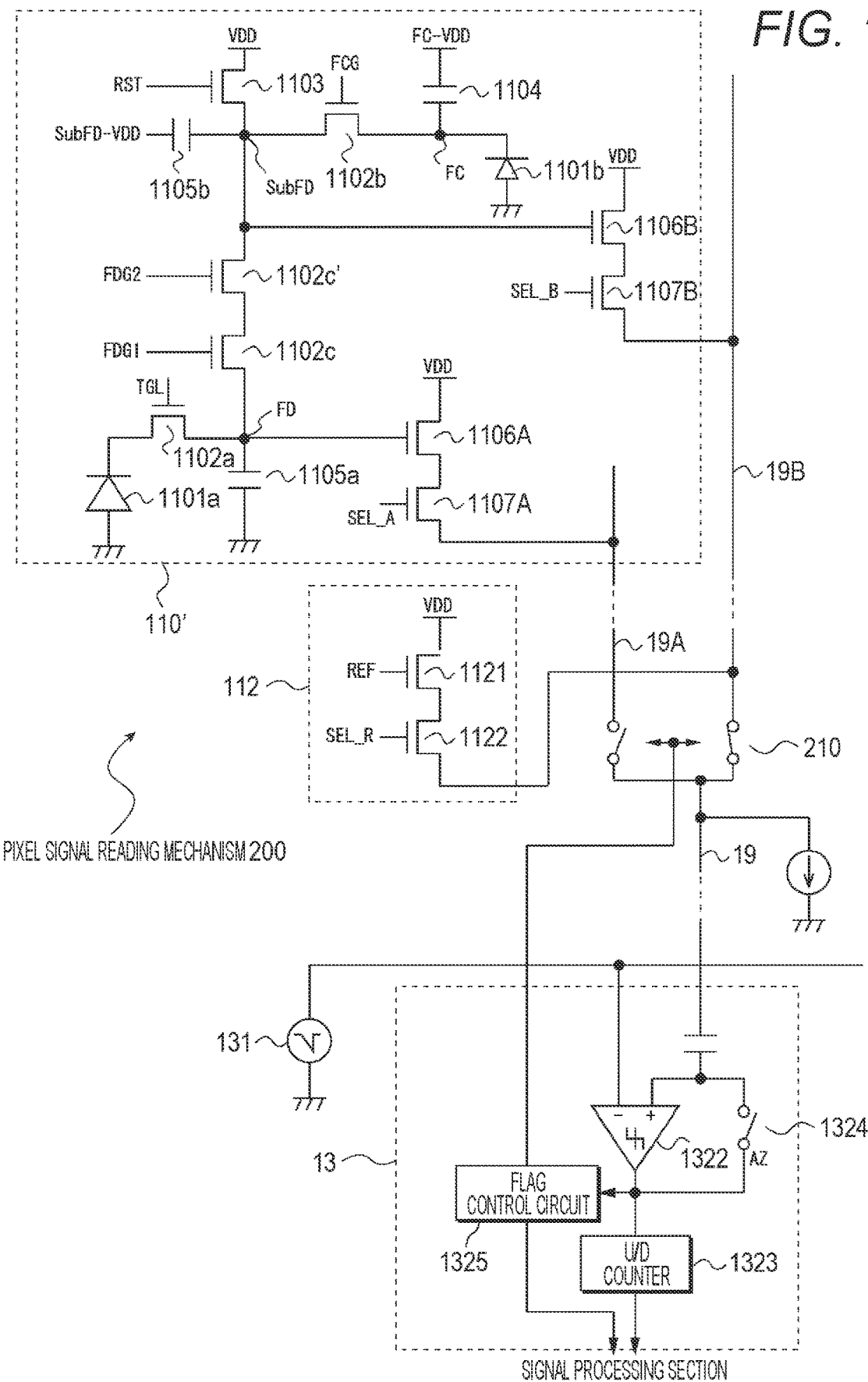
FIG. 12 is a diagram for explaining an example of the pixel signal reading mechanism in the solid-state imaging device according to an embodiment of the present technology.

FIG. 12 is a diagram for explaining an example of the pixel signal reading mechanism in the solid-state imaging device according to an embodiment of the present technology. As depicted in the drawing, in a pixel signal reading mechanism 200, a unit pixel 110' includes two source follower circuits connected to two vertical signal lines 19A and 19B, respectively. That is, the unit pixel 110' depicted in the drawing is different from the unit pixel 110 depicted in FIG. 3 in that an amplification transistor 1106B and a selection transistor 1107B are provided, and the third transfer gate section is configured by two-stage transfer gate sections 1102c and 1102c'. Note that, in the present disclosure, the vertical signal lines 19A and 19B are one aspect of a first read signal line and a second read signal line, respectively.

More specifically, an amplification transistor denoted by reference numeral 1106A and a selection transistor denoted by reference numeral 1107A are the same as the amplification transistor 1106 and the selection transistor 1107 depicted in FIG. 3, respectively. Therefore, the amplification transistor 1106A serves as an input section of the first source follower circuit for reading the charge held in the first FD section 1105a, and the source electrode is connected to the vertical signal line 19A via the selection transistor 1107A, thereby constituting the first source follower circuit with the constant current source 1108 connected to the vertical signal line 19.

Meanwhile, the amplification transistor 1106B is an NMOS transistor provided with the source electrode connected to the drain electrode of the selection transistor 1107B, the gate electrode connected to the second FD section 1105b, and the drain electrode connected to the power supply voltage VDD. Therefore, the amplification transistor 1106B serves as an input section of the second source follower circuit for reading the charge held in the second FD section 1105b, and the source electrode is connected to the vertical signal line 19B via the selection transistor 1107B, thereby constituting the source follower circuit with the constant current source 1108 connected to the vertical signal line 19.

The input control section 210 exclusively selects one of the vertical signal lines 19A or 19B in accordance with the determination result by the determination section 1321 (in the present example, the comparison result by the comparator 1322). That is, in the determination phase, the input control section 210 selects the vertical signal line 19B such that, for example, the pixel signal read from the vertical signal line 19B is compared with the reference signal. Moreover, the input control section 210 selects one of the vertical signal lines 19A or 19B for reading the pixel signal in a period in which the pixel signal is read out according to a result of the comparison.

Figure 13:
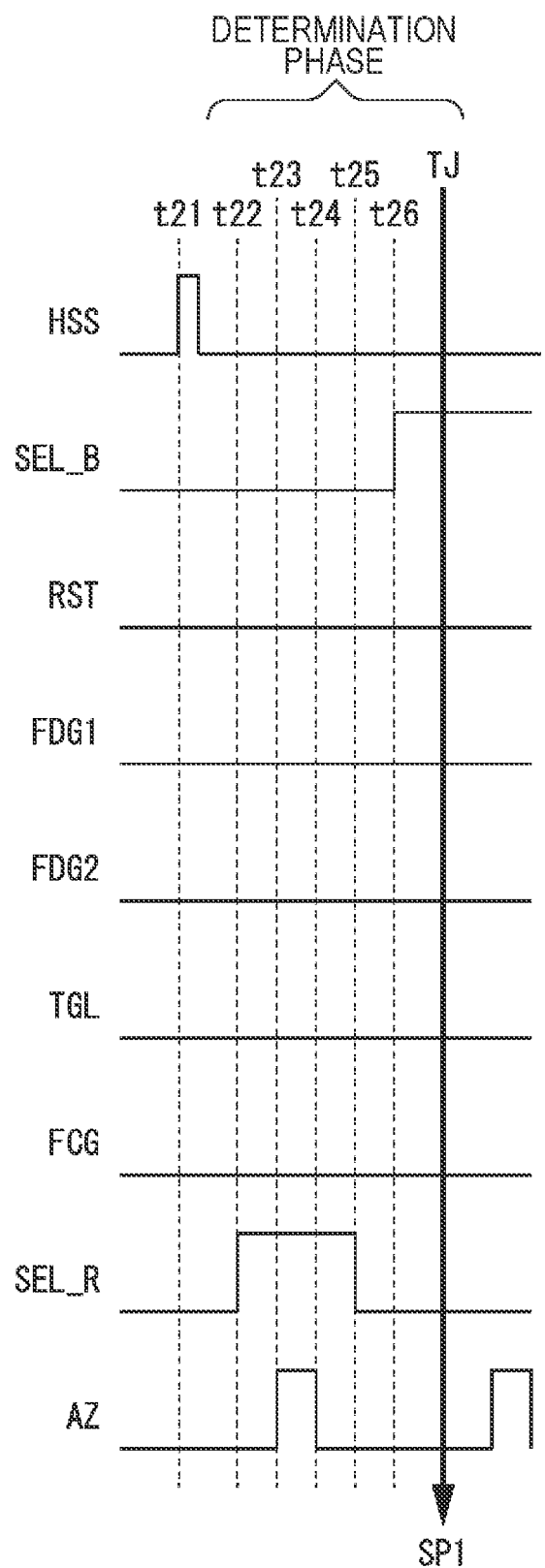
FIG. 13 is a timing chart for explaining an example of operation of the pixel signal reading mechanism of the solid-state imaging device according to an embodiment of the present technology.

FIG. 13 is a timing chart for explaining an example of the operation of the pixel signal reading mechanism of the solid-state imaging device according to an embodiment of the present technology. Specifically, the drawing is a timing chart depicting an example of the pixel signal reading processing of the unit pixel 110' from the vertical signal line 19B in the determination phase. Note that the processing depicted in the drawing is substantially the same as the determination phase depicted in FIG. 10 except that the pixel signal is read out using the vertical signal line 19B, but is different from the processing depicted in FIG. 9 in that the drive signal FDG2 to the third transfer gate section 1102c 1102c' is controlled in addition to the drive signal FDG1 to the third transfer gate section 1102c.

Referring to the drawing, first, at time t21, the horizontal synchronization signal HSS is input, and the readout period of the unit pixel 110 starts. At this time, the input control section 210 selects the vertical signal line 19B under the control of the flag control circuit 1325. As a result, the vertical signal line 19B is connected to the comparator 1322 via the vertical signal line 19.

Next, at time t22, the drive signal SEL_R of the base signal generation circuit 112 reaches a high potential level, and the selection transistor 1122 enters a conductive state. As a result, the base signal applied to the gate electrode of the amplification transistor 1121 is input to the comparator 1322 via the vertical signal line 19B.

Subsequently, at time t23, the AZ switch 1324 is turned on, and the auto zero signal AZ causes the comparator 1322 to have an output of zero to its input, whereby the initialization of the comparator 1322 is started.

Thereafter, at time t24, the AZ switch 1324 is turned off, and subsequently, at time t25, the drive signal SEL_R reaches a low potential level, and the selection transistor 1122 enters a non-conductive state. As a result, the initialization of the comparator 1322 according to the base signal is completed.

Next, at time t26, the drive signal SEL_B reaches a high potential level, and the selection transistor 1107B enters a conductive state. In the present example, the potential levels of the drive signals FDG1 and FDG2 remain at low potential levels. As a result, a pixel signal according to the potential FD of the first FD section 1105a is output to the vertical signal line 19B. At this time, the voltage level of the reference signal to the comparator 1322 gradually decreases, and comparison between the pixel signal and the reference signal by the comparator 1322 is started.

In the comparison by the comparator 1322, in a case where the voltage level of the pixel signal is lower than the voltage level of the reference signal at the time point (time TJ) when the voltage level of the reference signal has dropped to the low potential level, the comparison result signal output by the comparator 1322 remains at the low potential level. This is because the amount of charge having overflowed through the first photoelectric conversion section 1101*a* in the exposure processing is small, and the AD converter 132 processes a pixel signal corresponding to dark light. In this case, the flag control circuit 1325 holds a flag indicating the high sensitivity mode, and controls the input control section 210 to select the vertical signal line 19A.

Meanwhile, in a case where the voltage level of the pixel signal is higher than the voltage level of the reference signal, the comparison result signal output from the comparator 1322 is inverted to a high potential level. This is because the amount of charge having overflowed through the first photoelectric conversion section 1101*a* in the unit pixel 110 is large to some extent or sufficiently, and the AD converter 132 processes a pixel signal corresponding to bright light. In this case, the flag control circuit 1325 holds a flag indicating the low sensitivity mode.

As described above, the determination phase at the head of the pixel signal readout period by the pixel signal reading mechanism 20 ends. In the present embodiment, since the reset with respect to the potential of the specific floating diffusion by the drive signal RST is not performed immediately after the exposure processing, the charge accumulated in the first photoelectric conversion section 1101*a* and overflowing the first transfer gate section 1102*a* indicates the initial state. In addition, in the present embodiment, the brightness/darkness determination of the light received by the unit pixel 110 is performed on the basis of the pixel signal based on the charge accumulated in the first FD section 1105*b*, but the present invention is not limited thereto. As described above, the brightness/darkness determination of the light received by the unit pixel 110 may be performed on the basis of the pixel signal based on the charge accumulated in the first FD section 1105*a*.

Figure 14A:
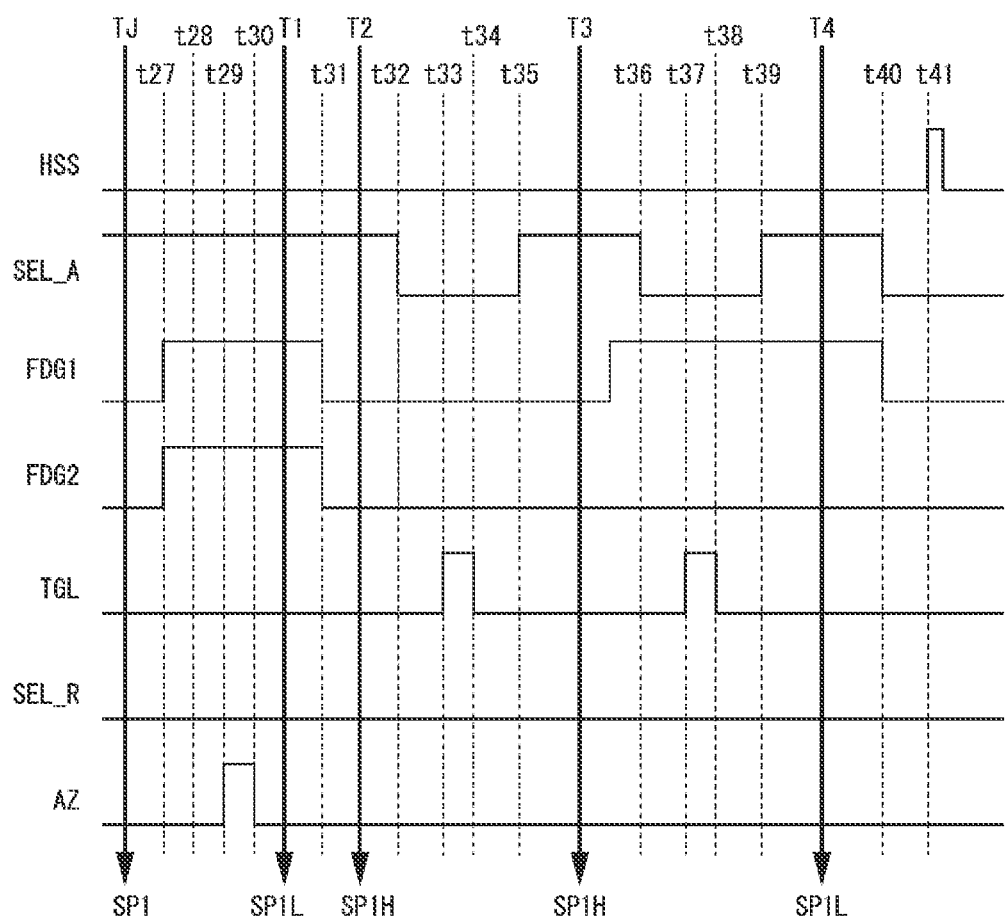
FIG. 14A is a timing chart for explaining an example of operation of the pixel signal reading mechanism of the solid-state imaging device according to an embodiment of the present technology.
Figure 14B:
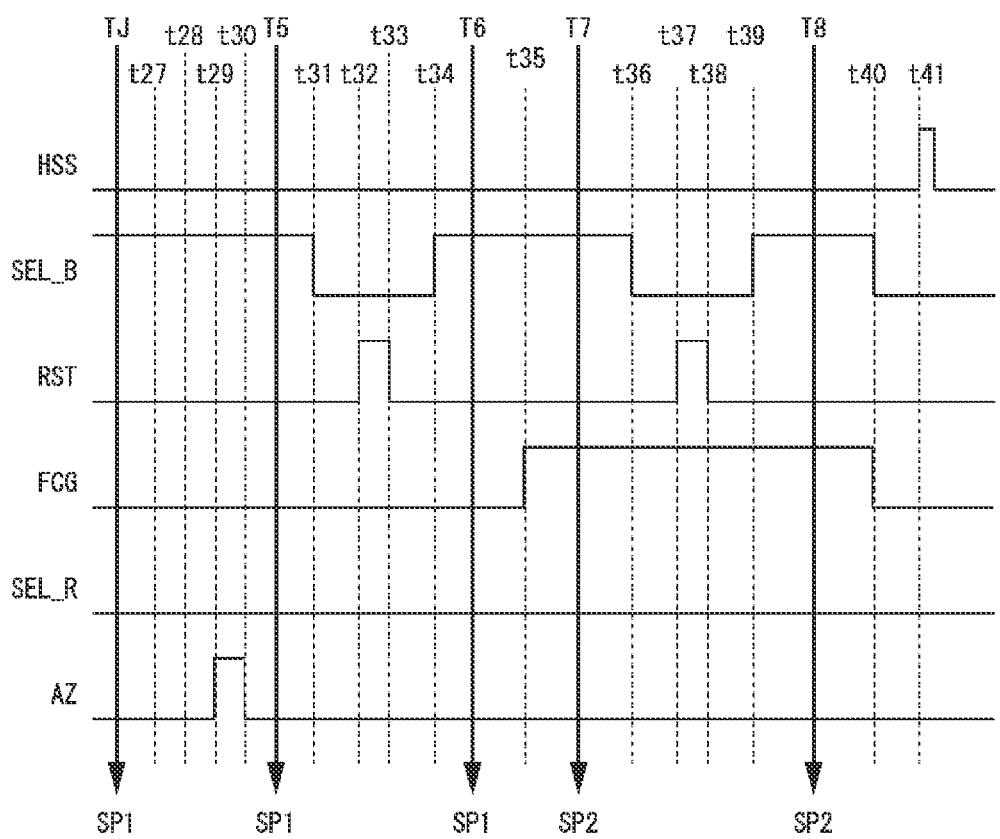
FIG. 14B is a timing chart for explaining an example of the operation of the pixel signal reading mechanism of the solid-state imaging device according to an embodiment of the present technology.

FIGS. 14A and 14B are timing charts for explaining an example of the operation of the pixel signal reading mechanism of the solid-state imaging device according to an embodiment of the present technology. In the present embodiment, the pixel signal reading mechanism 200 performs the pixel signal reading processing corresponding to the dark light and the pixel signal reading processing (drive control) corresponding to the bright light in parallel according to the timing charts of A of the drawing and B of the drawing. In A of the drawing and B of the drawing, for convenience, timing charts after the pixel signal SP1 is read at time TJ of the determination phase depicted in FIG. 13 are depicted. Note that the AD conversion processing is performed only on the pixel signal selected by the determination result.

That is, A of the drawing is a timing chart depicting an example of the pixel signal reading processing from the unit pixel 110' to the vertical signal line 19A after the determination phase. A of the drawing depicts a timing chart of the horizontal synchronization signal HSS, the drive signals SEL_A, FDG1, FDG2, and TGL for the unit pixel 110, the drive signal SEL_R for the base signal generation circuit 112, and the auto zero signal AZ for the comparator 1322. The pixel signal reading processing depicted in A of the drawing is substantially the same as the processing depicted in FIG. 10, but is different from the processing depicted in FIG. 9 in that the drive signal FDG2 is applied before the pixel signal SP1L is read at time T1.

That is, in a state where the drive signal FDG1 is at a high potential level, the drive signals FDG1 and FDG2 reach high potential levels from time t27 to time t31, and the third transfer gate sections 1102*c* and 1102*c'* enter conductive states. As a result, the potential of the region where the first FD section 1105*a* and the second FD section 1105*b* are coupled is coupled.

Next, from time t29 to time t30, the AZ switch 1324 is turned on, and the auto zero signal AZ causes the comparator 1322 to have an output of zero to its input, whereby the comparator 1322 is initialized according to the base signal.

Note that the operation from time T1 to time t40 is the same as the processing from time T1 to time t34 depicted in FIG. 10, and thus the description thereof will be omitted.

As described above, the pixel signal reading mechanism 200 controls driving of the unit pixel 110 such that the pixel signals SP1H and SP1L corresponding to bright light are read out to the vertical signal line 19A between times t30 and t40.

Meanwhile, B of the drawing is a timing chart depicting an example of the pixel signal reading processing from the unit pixel 110' to the vertical signal line 19B after the determination phase. A of the drawing depicts a timing chart of the horizontal synchronization signal HSS, the drive signals SEL_B, RST, and FCG for the unit pixel 110, the drive signal SEL_R for the base signal generation circuit 112, and the auto zero signal AZ for the comparator 1322. The pixel signal reading processing depicted in B of the drawing is the same as the processing from time t35 to time t49 depicted in FIG. 9, and is performed simultaneously in parallel with the pixel signal reading processing depicted in A of the drawing. Therefore, the pixel signal reading mechanism 200 controls driving of the unit pixel 110 such that the pixel signals SP1L and SP2 corresponding to dark light are read out to the vertical signal line 19A during the period from time t29 to time t40.

As described above, according to the present embodiment, since the pixel signal reading mechanism 200 includes the two systems of vertical signal lines 19A and 19B, it is possible to read each of the pixel signal corresponding to the high sensitivity mode and the pixel signal corresponding to the low sensitivity mode in parallel. In addition, according to the present embodiment, since the pixel signal reading mechanism 200 selects one pixel signal according to the determination result in the determination phase after the exposure processing and performs the AD conversion processing on the selected pixel signal, it is possible to improve the frame rate by shortening the processing time and reduce the power consumption.

5. Fifth Embodiment

The present embodiment is a modification of the embodiments described above, and depicts various modifications of the circuit configuration of the unit pixel 110 in the pixel array section 11 of the solid-state imaging device 1. The circuit configuration of the unit pixel may depend on whether the width of the dynamic range is emphasized in order to emphasize the image quality, whether the number of transistors is suppressed, or the like, in consideration of the cost in designing the solid-state imaging device 1. In the following, various modifications of the unit pixel 110 depicted in FIG. 3 and the like will be described, but such modifications are also applicable to the circuit configuration of the unit pixel 110' depicted in FIG. 12 from a similar viewpoint. Even in a case where unit pixels having such various circuit configurations are used, it is possible to determine brightness/darkness of received light in the determination phase.

First, similarly to the embodiments described above, FIGS. 15 to 19 depict circuit configurations of various unit pixels configured to include two types of photodiodes having different sensitivities.

Figure 15:
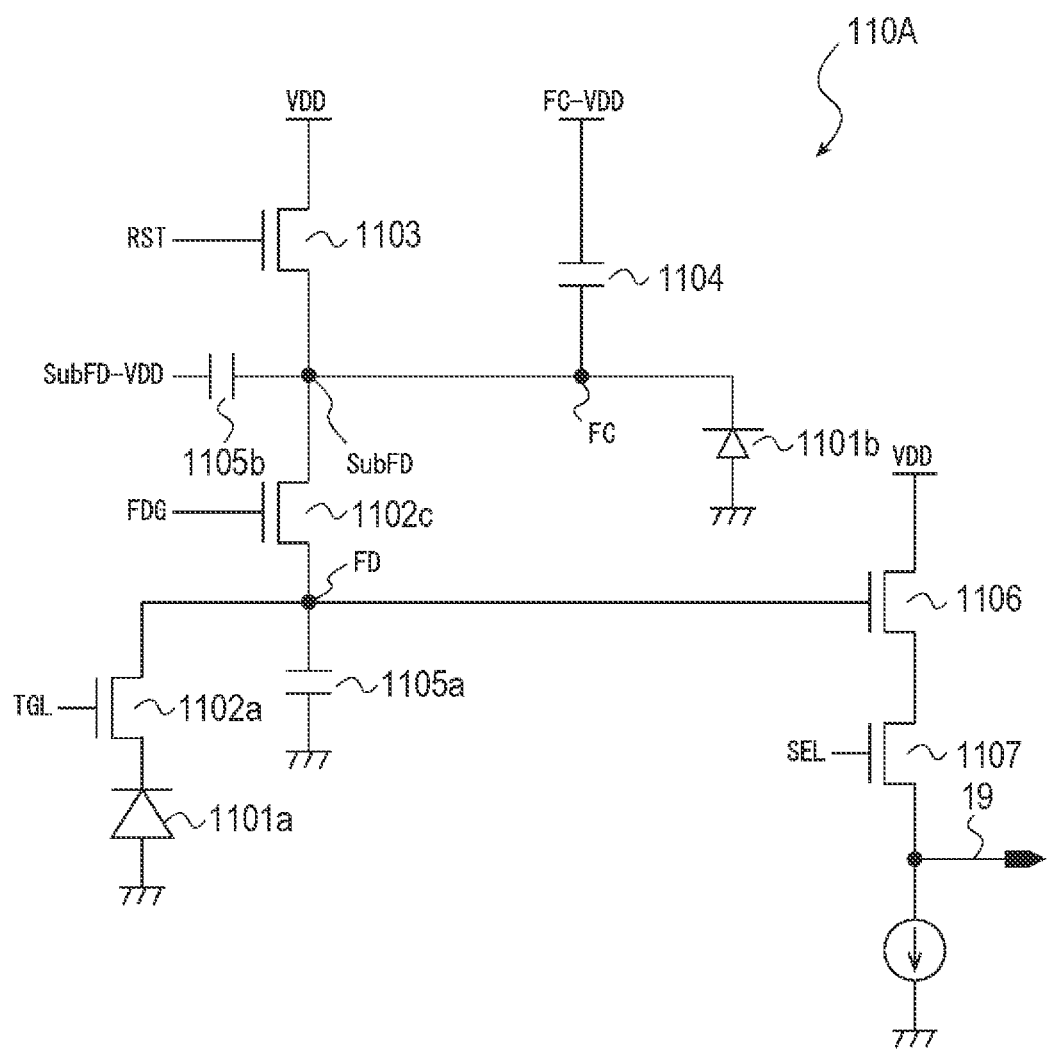
FIG. 15 is a diagram depicting an example of a circuit configuration of a unit pixel in a pixel array section of the solid-state imaging device according to an embodiment of the present technology.

Specifically, the unit pixel 110A depicted in FIG. 15 is different from the unit pixel 110 depicted in FIG. 3 in that the second transfer gate section 1102b is not provided (omitted). Therefore, the potential of the charge accumulation section 1104 and the potential of the second FD section 1105b are always coupled.

Figure 16:
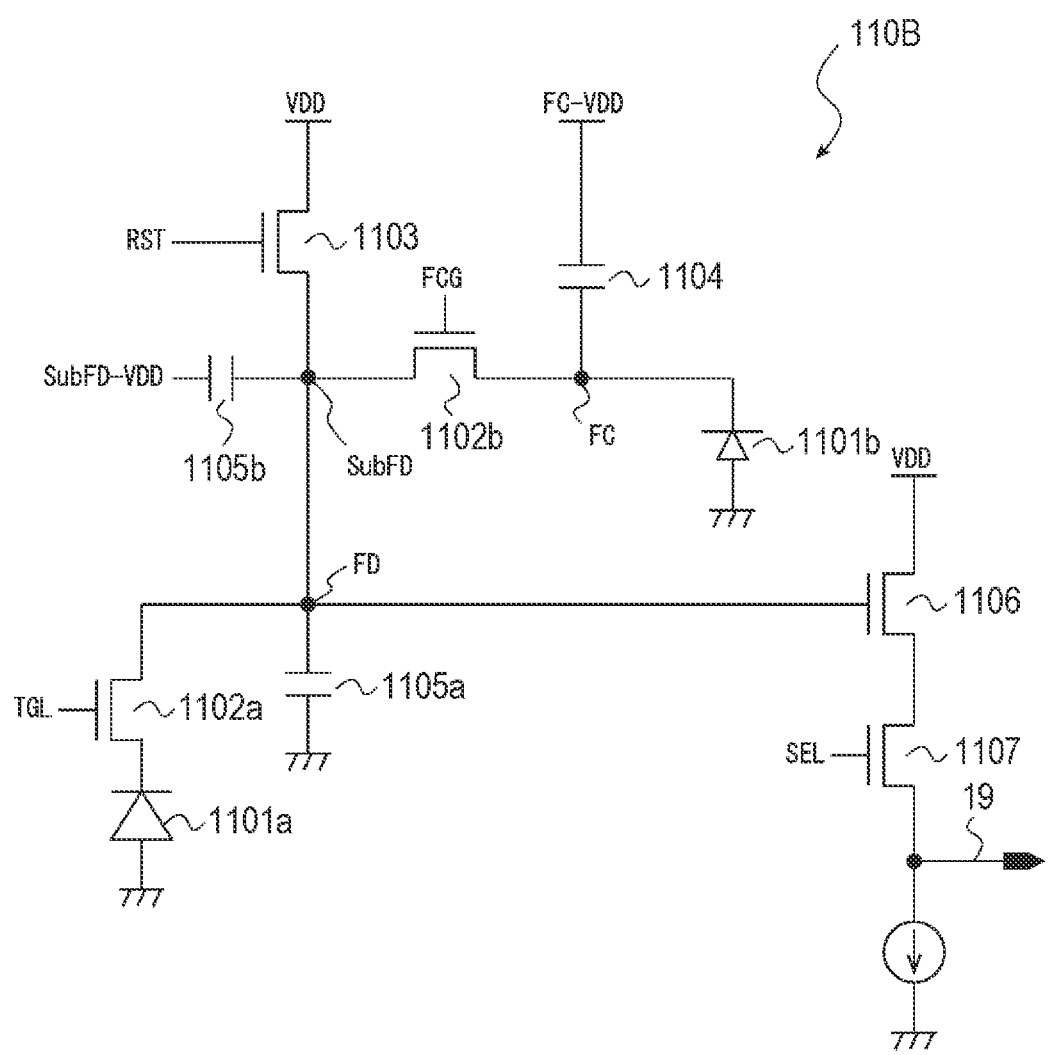
FIG. 16 is a diagram depicting an example of a circuit configuration of a unit pixel in a pixel array section of the solid-state imaging device according to an embodiment of the present technology.

The unit pixel 110B depicted in FIG. 16 is different from the unit pixel 110 depicted in FIG. 3 in that the first transfer gate section 1102a is not provided. Therefore, the potential of the first FD section 1105a and the potential of the second FD section 1105b are always coupled.

Figure 17:
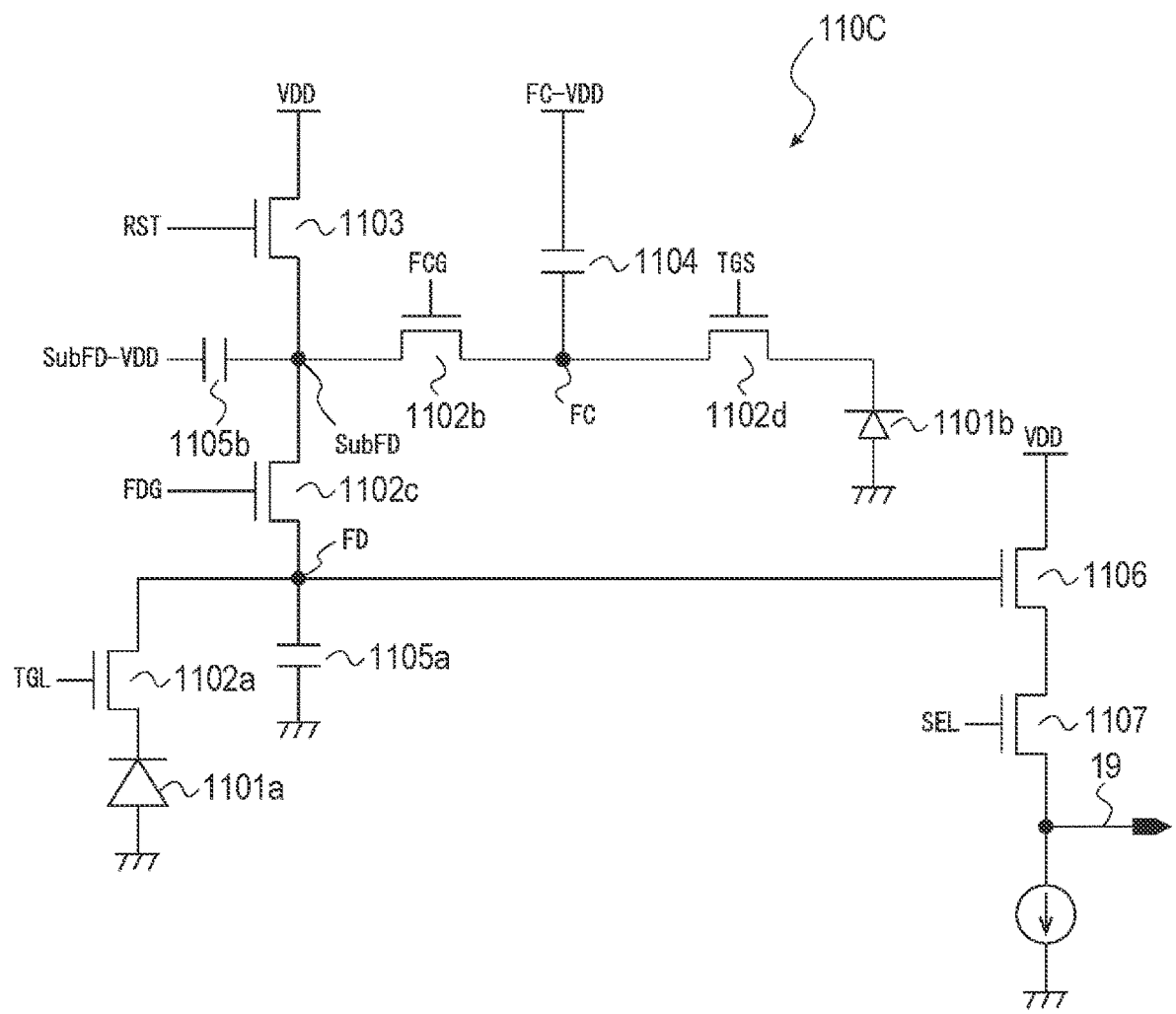
FIG. 17 is a diagram depicting an example of a circuit configuration of a unit pixel in a pixel array section of the solid-state imaging device according to an embodiment of the present technology.

A unit pixel 110C depicted in FIG. 17 is different from the unit pixel 110 depicted in FIG. 3 in that a fourth transfer gate section 1102d is provided between the charge accumulation section 1104 and the second photoelectric conversion section 1101b. When the drive signal TGS is applied to the gate electrode of the fourth transfer gate section 1102d, the fourth transfer gate section 1102d enters a conductive state. As a result, the charge photoelectrically converted by the second photoelectric conversion section 1101b is transferred to and accumulated in the charge accumulation section 1104.

Figure 18:
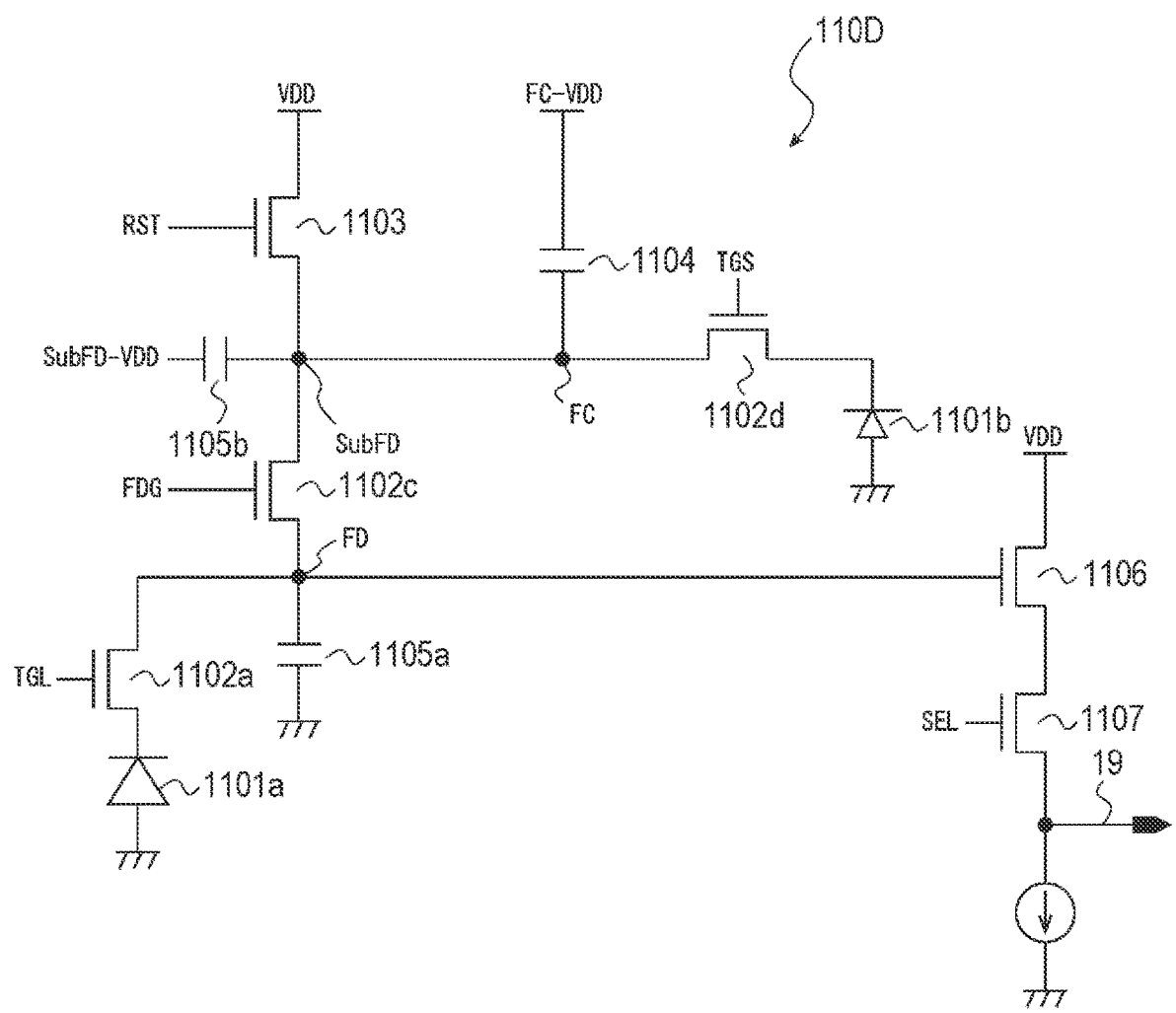
FIG. 18 is a diagram depicting an example of a circuit configuration of a unit pixel in a pixel array section of the solid-state imaging device according to an embodiment of the present technology.

The unit pixel 110D depicted in FIG. 18 is different from the unit pixel 110C depicted in FIG. 17 in that the second transfer gate section 1102b is not provided. Therefore, the potential of the charge accumulation section 1104 and the potential of the second FD section 1105b are always coupled. In addition, the charge photoelectrically converted by the second photoelectric conversion section 1101b by the application of the drive signal TGS to the gate electrode of the fourth transfer gate section 1102d is transferred to and accumulated in the charge accumulation section 1104.

Figure 19:
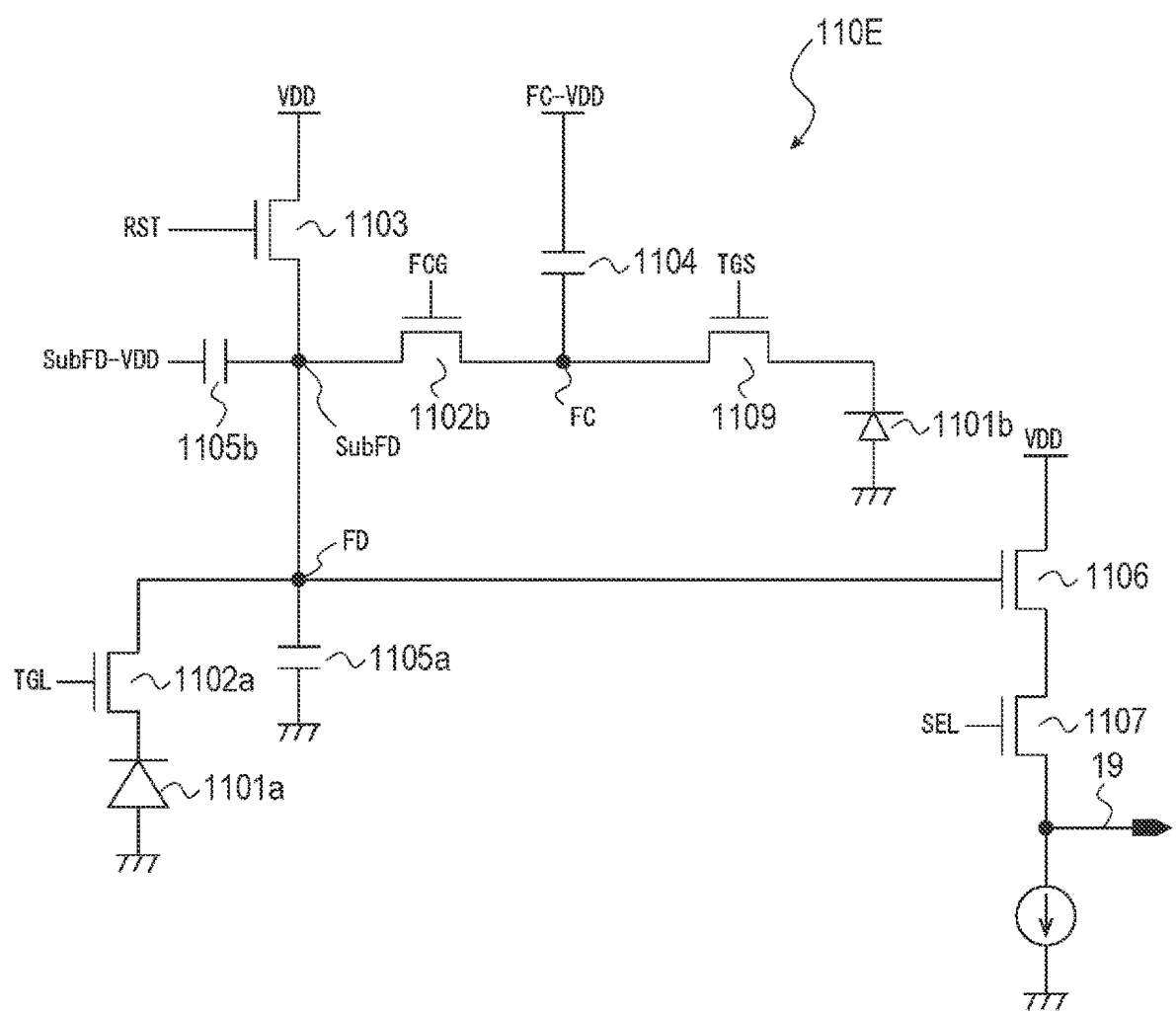
FIG. 19 is a diagram depicting an example of a circuit configuration of a unit pixel in a pixel array section of the solid-state imaging device according to an embodiment of the present technology.

The unit pixel 110E depicted in FIG. 19 is different from the unit pixel 110C depicted in FIG. 17 in that the first transfer gate section 1102a is not provided. Therefore, the potential of the first FD section 1105a and the potential of the second FD section 1105b are always coupled.

Next, the unit pixels 110F to 110K depicted in FIGS. 20 to 25 will be described. FIGS. 20 to 25 depict circuit configurations of various unit pixels configured using only a single photodiode. Even with such a configuration using only a single photodiode, the charge overflowing from the photodiode is extracted and accumulated by conduction control of the transfer gate, whereby the dynamic range can be expanded. A solid-state imaging device of a type that simultaneously secures a high S/N ratio and a high saturation signal amount for each pixel using such a single photodiode is called a lateral overflow integration capacitor (LOFIC) image sensor.

Figure 20:
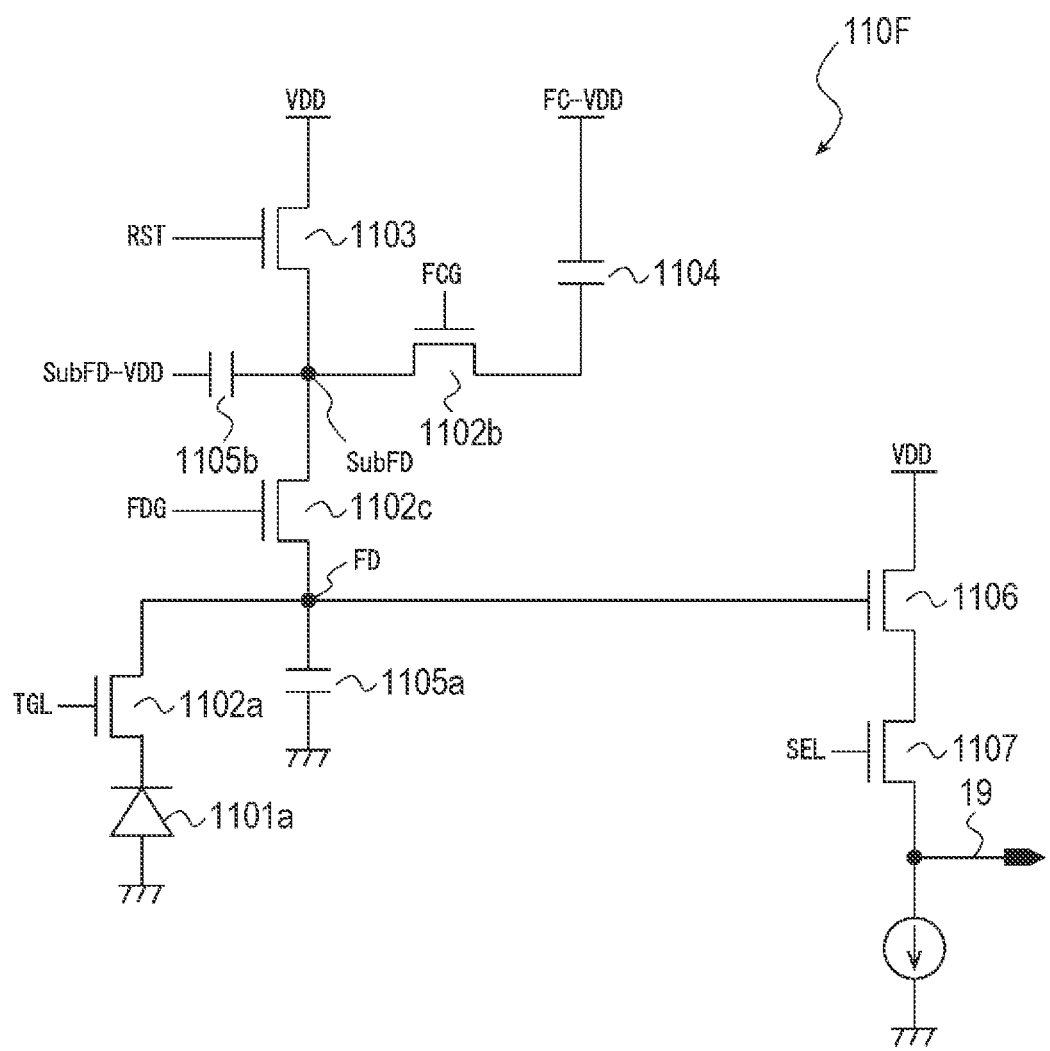
FIG. 20 is a diagram depicting an example of a circuit configuration of a unit pixel in a pixel array section of the solid-state imaging device according to an embodiment of the present technology.

That is, the unit pixel 110F depicted in FIG. 20 is different from the unit pixel 110 depicted in FIG. 3 in that the second photoelectric conversion section 1101b is not provided. In the unit pixel 110F depicted in FIG. 20, by applying the drive signal FDG to the gate electrode of the first transfer gate section 1102a and applying the drive signal FCG to the gate electrode of the second transfer gate section 1102b, the charge photoelectrically converted and accumulated by the first photoelectric conversion section 1101a is transferred to and accumulated in the charge accumulation section 1104.

Figure 21:
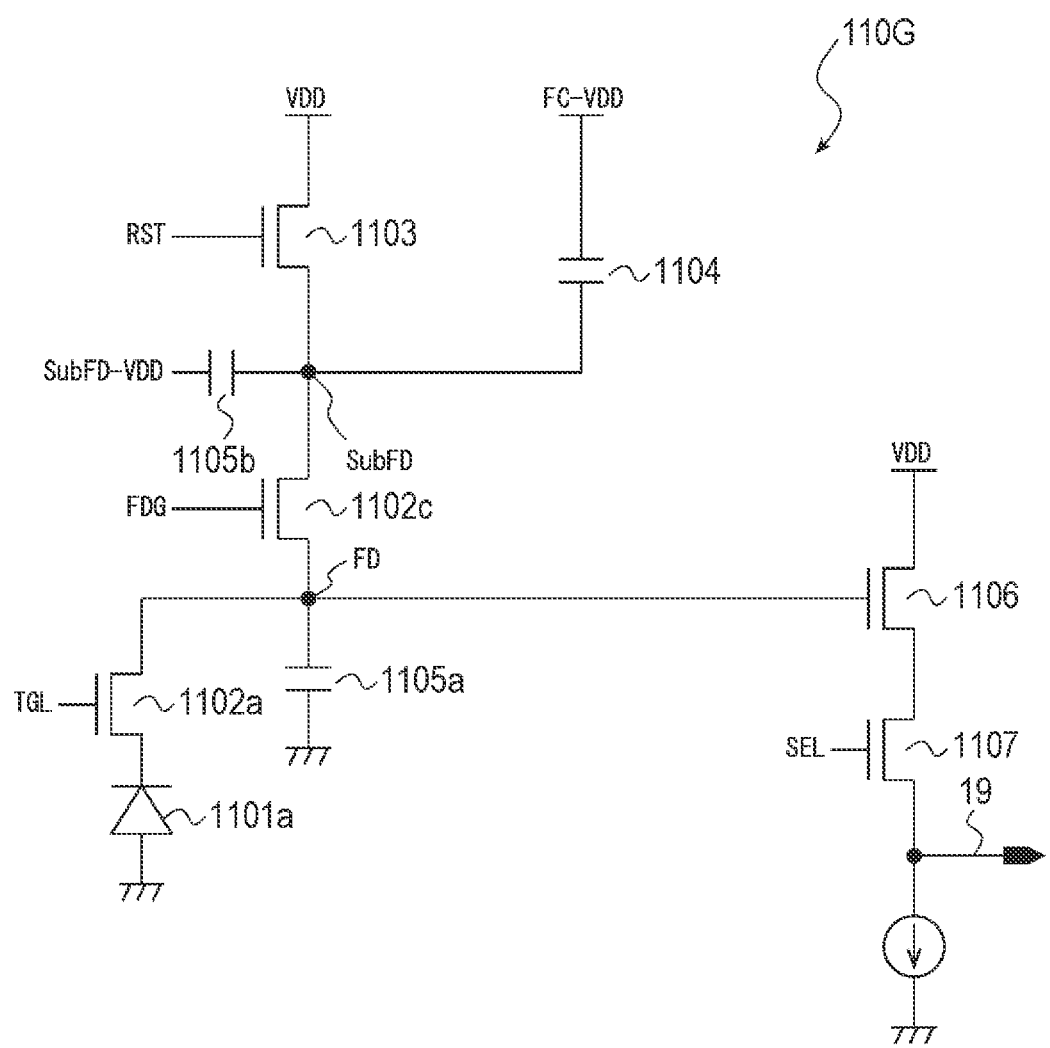
FIG. 21 is a diagram depicting an example of a circuit configuration of a unit pixel in a pixel array section of the solid-state imaging device according to an embodiment of the present technology.

The unit pixel 110G depicted in FIG. 21 is different from the unit pixel 110 depicted in FIG. 20 in that the second transfer gate section 1102b is not provided. Therefore, the potential of the charge accumulation section 1104 and the potential of the second FD section 1105b are always coupled.

Figure 22:
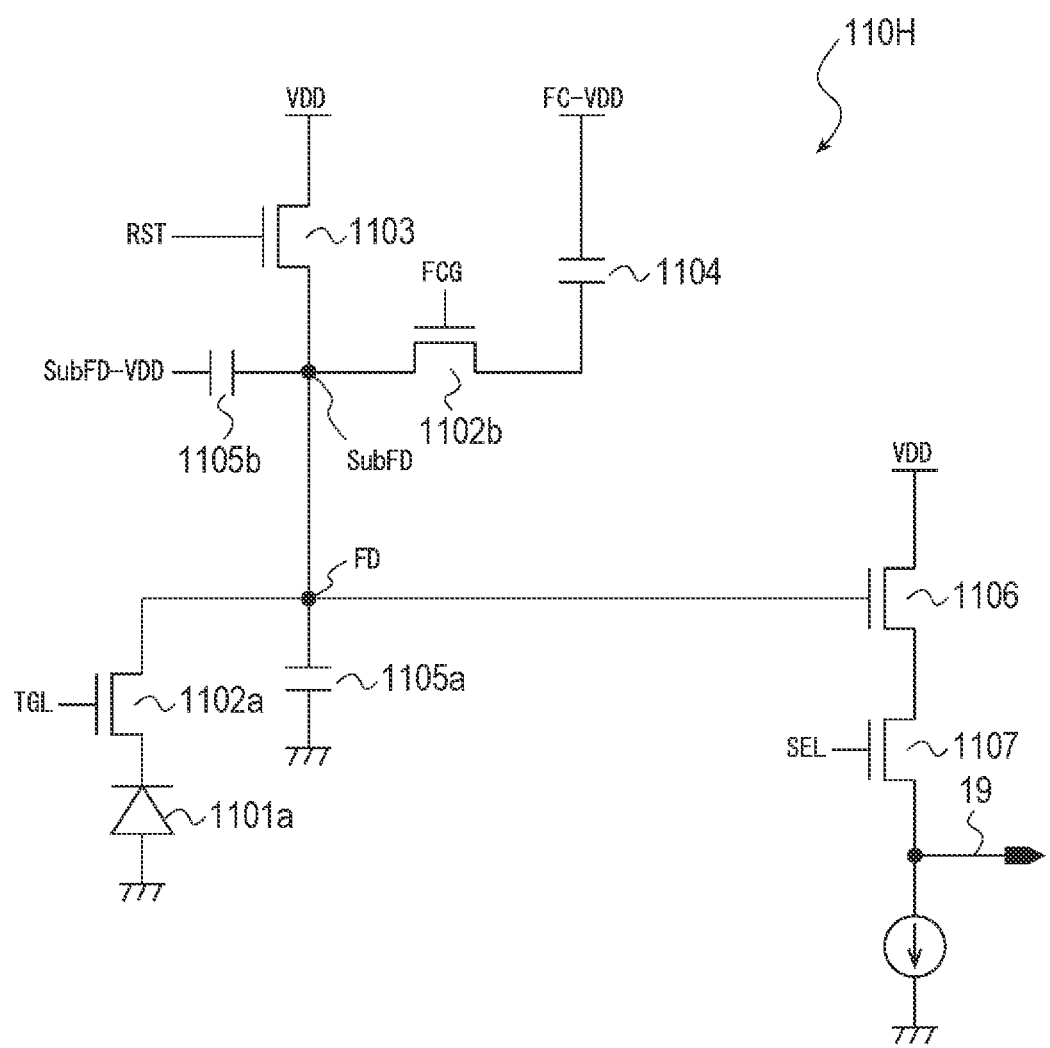
FIG. 22 is a diagram depicting an example of a circuit configuration of a unit pixel in a pixel array section of the solid-state imaging device according to an embodiment of the present technology.

The unit pixel 110H depicted in FIG. 22 is different from the unit pixel 110 depicted in FIG. 20 in that the first transfer gate section 1102a is not provided. Therefore, the potential of the first FD section 1105a and the potential of the second FD section 1105b are always coupled.

Figure 23:
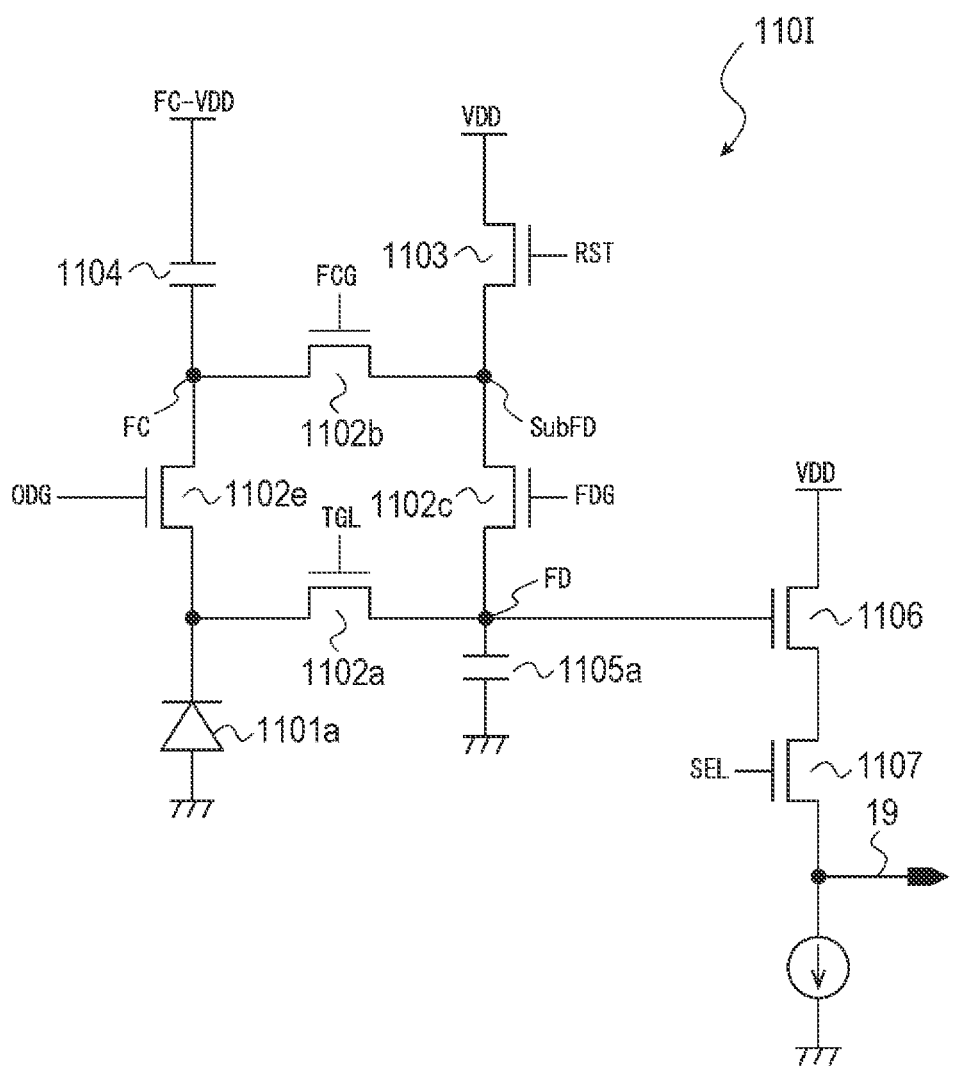
FIG. 23 is a diagram depicting an example of a circuit configuration of a unit pixel in a pixel array section of the solid-state imaging device according to an embodiment of the present technology.

A unit pixel 110I depicted in FIG. 23 is different from the unit pixel 110 depicted in FIG. 20 in that a fifth transfer gate section 1101e is provided between the first photoelectric conversion section 1101a and the charge accumulation section 1104. That is, the fifth transfer gate section 1101e is provided with the source electrode connected to the cathode electrode of the first photoelectric conversion section 1101a and the drain electrode connected to the charge accumulation section 1104.

Figure 24:
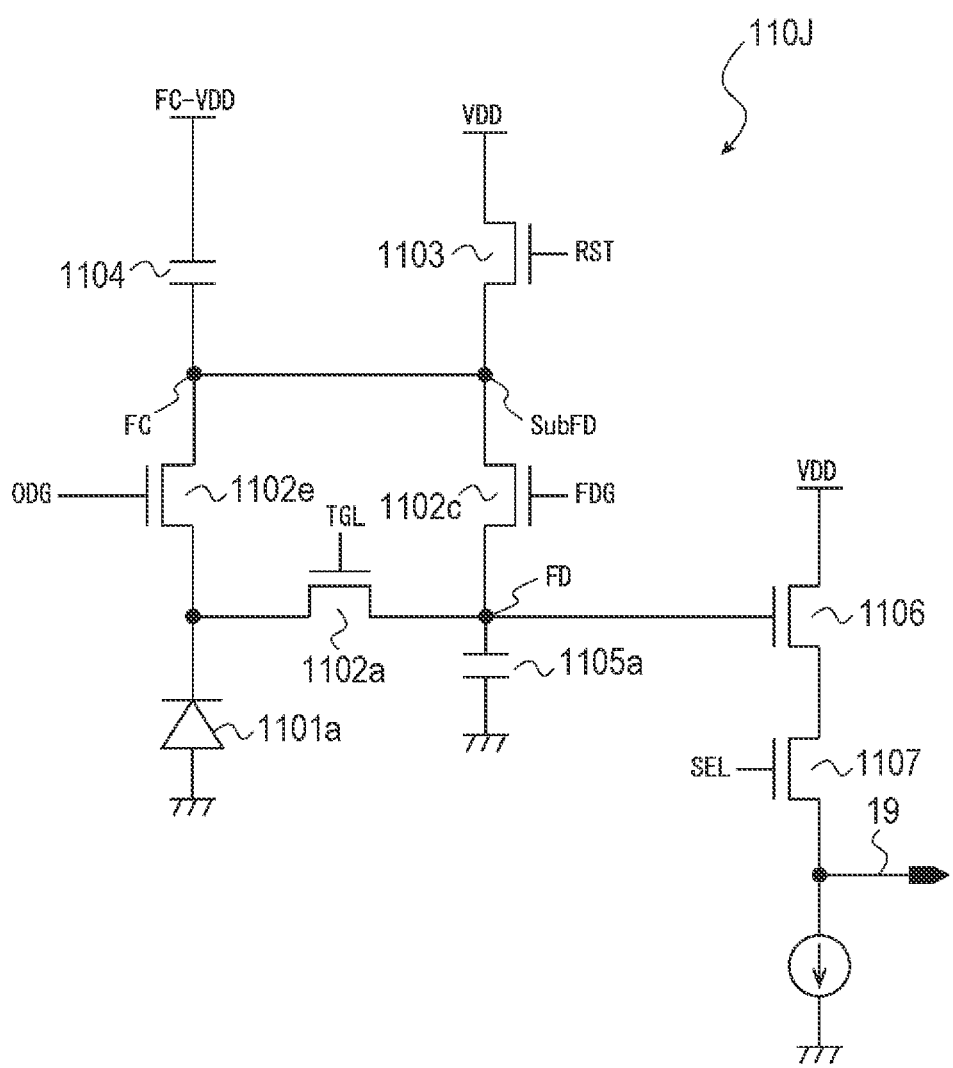
FIG. 24 is a diagram depicting an example of a circuit configuration of a unit pixel in a pixel array section of the solid-state imaging device according to an embodiment of the present technology.

The unit pixel 110J depicted in FIG. 24 is different from the unit pixel 110I depicted in FIG. 23 in that the second transfer gate section 1102b is not provided.

Figure 25:
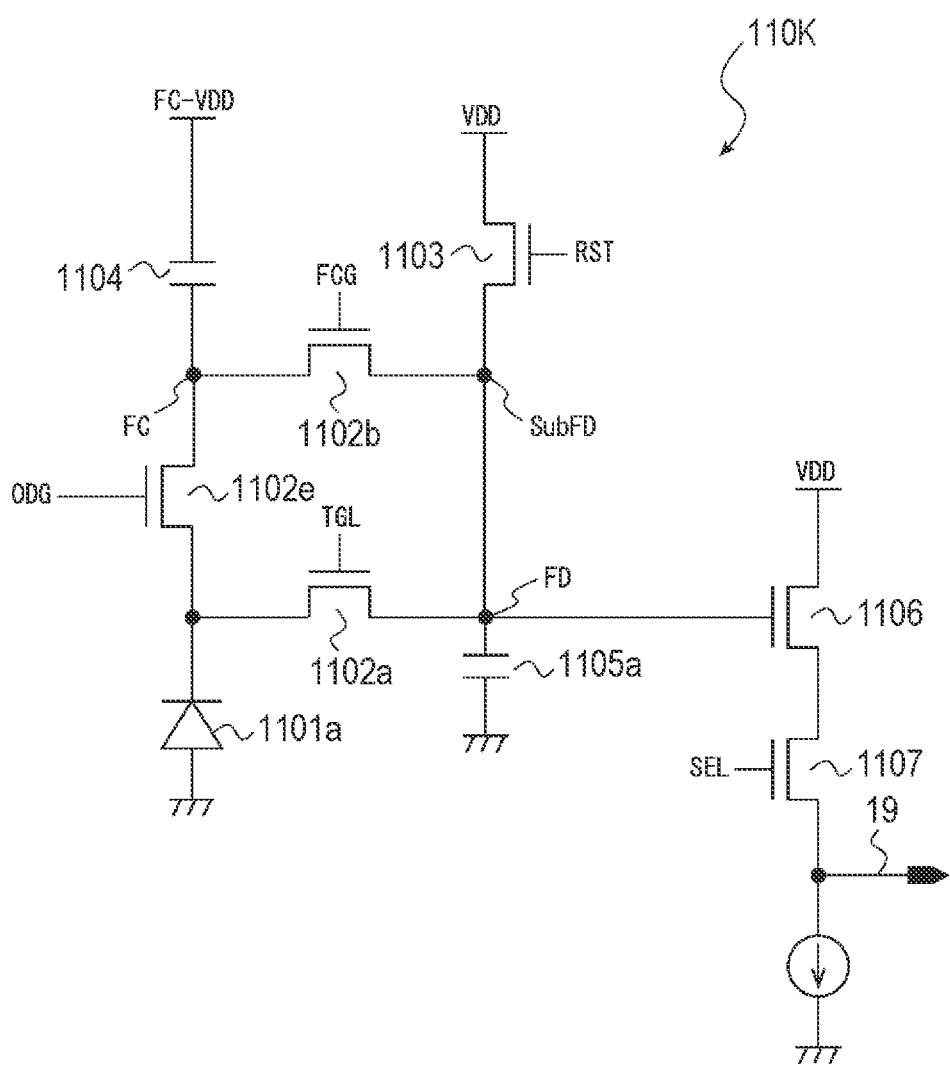
FIG. 25 is a diagram depicting an example of a circuit configuration of a unit pixel in a pixel array section of the solid-state imaging device according to an embodiment of the present technology.

The unit pixel 110K depicted in FIG. 25 is different from the unit pixel 110I depicted in FIG. 23 in that the first transfer gate section 1102a is not provided.

In the present technology, even in a case where the unit pixels 110A to 110K having various circuit configurations as depicted in FIG. 15 to 25 are applied, similarly, in the determination phase after the exposure processing, the pixel signal based on the charge of the predetermined floating diffusion region can be read, and the brightness/darkness of the received light can be determined on the basis of the read pixel signal.

6. Application Example to Mobile Body

The technology according to embodiments of the present disclosure (present technology) can be applied to various products. For example, the present technology may be implemented as a device (electric device) mounted on any type of mobile body such as an automobile, an electric vehicle, a hybrid electric vehicle, a motorcycle, a bicycle, a personal mobility, an airplane, a drone, a ship, a robot, and the like. In the following example, the solid-state imaging device 1 according to the present technology will be described as an imaging section or a part thereof.

Figure 26:
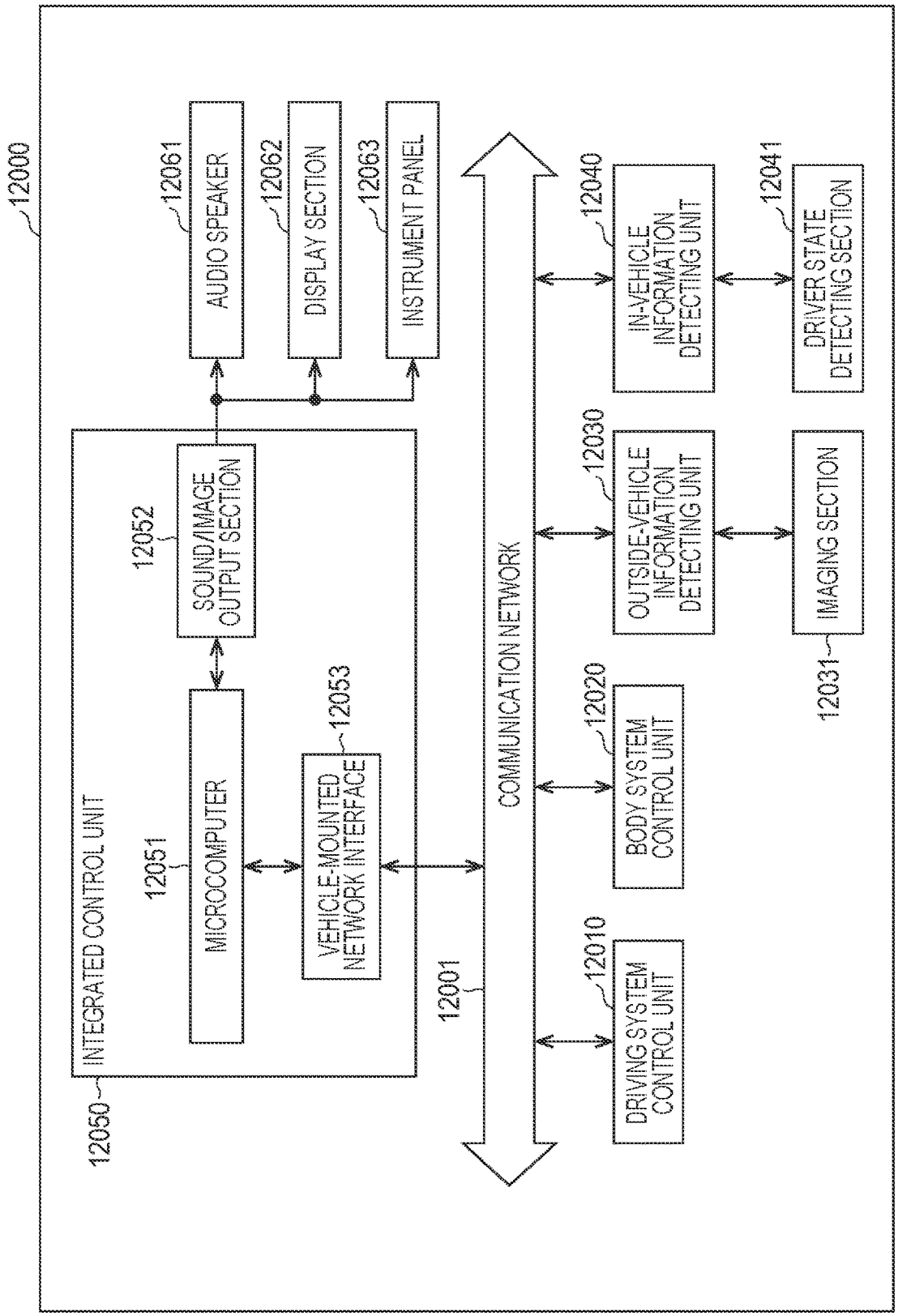
FIG. 26 is a block diagram depicting an example of a schematic configuration of a vehicle control system to which the solid-state imaging device according to an embodiment of the present technology is applied.

FIG. 26 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 26, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are depicted as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 26, an audio speaker 12061, a display section 12062, and an instrument panel 12063 are depicted as the output device. The display section 12062 may, for example, include at least one of an on-board display and a head-up display.

Figure 27:
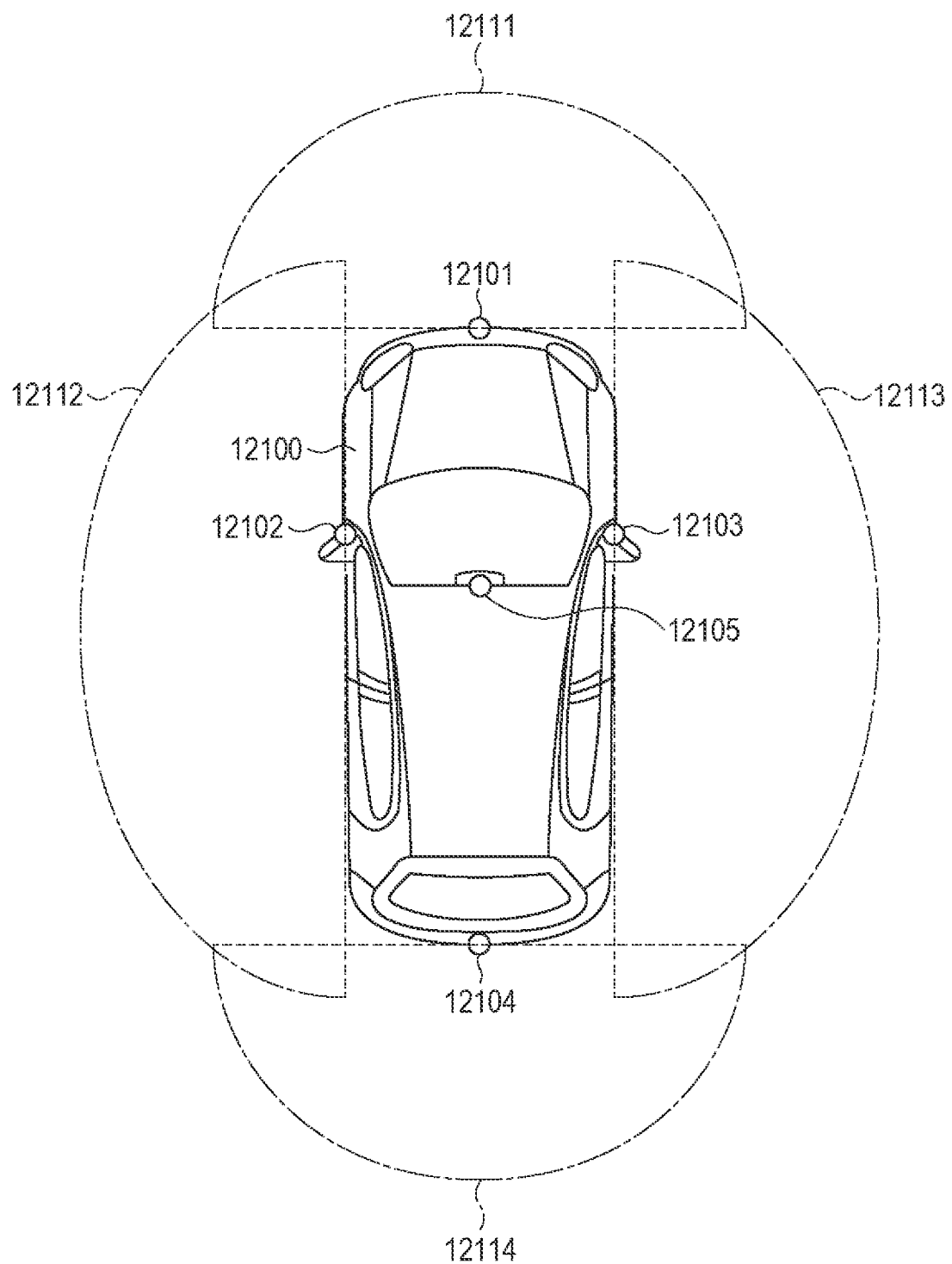
FIG. 27 is an explanatory diagram depicting an example of installation positions of an outside-vehicle information detecting section and an imaging section to which the solid-state imaging device according to an embodiment of the present technology is applied.

FIG. 27 is a diagram depicting an example of the installation position of the imaging section 12031.

In FIG. 27, the vehicle 12100 includes imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The front images acquired by the imaging sections 12101 and 12105 are used mainly to detect a preceding vehicle, a pedestrian, an obstacle, a signal, a traffic sign, a lane, or the like.

Incidentally, FIG. 27 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the present technology can be applied has been described above. The present technology can be applied to the imaging section 12031 and the like among the configurations described above. Specifically, the solid-state imaging device 1 depicted in FIG. 1 can be applied to the imaging section 12031. By applying the technology according to embodiments of the present disclosure to the imaging section 12031, it is possible to obtain good image quality and reduce driver's fatigue by expanding a dynamic range while reducing power consumption.

Each of the embodiments described above is an example for explaining the present technology, and is not intended to limit the present technology only to these embodiments. The present technology can be implemented in various forms without departing from the gist thereof.

For example, in the methods disclosed in the present specification, steps, operations, or functions may be performed in parallel or in a different order as long as there is no inconsistency in the results. The described steps, operations, and functions are provided merely as examples, and some of the steps, operations, and functions may be omitted without departing from the gist of the invention, or may be coupled with each other to form one, or other steps, operations, or functions may be added.

In addition, although various embodiments are disclosed in the present specification, certain features (technical matters) in one embodiment can be added to or replaced with certain features in other embodiments while being modified as appropriate, and such forms are also included in the gist of the present invention.

In addition, the present technology may be configured to include the following technical matters.

(1)

A solid-state imaging device including:

a pixel array section including a photoelectric conversion section that performs photoelectric conversion according to intensity of light received, the pixel array section including a plurality of unit pixels capable of accumulating charge photoelectrically converted by the photoelectric conversion section in a predetermined floating diffusion region;

a system control section that controls the pixel array section; and a pixel signal reading mechanism that reads a pixel signal based on the charge from the predetermined floating diffusion region of a unit pixel of the plurality of unit pixels via a read signal line under control of the system control section, in which the pixel signal reading mechanism includes:

an AD converter that performs AD conversion processing on the pixel signal read; and a determination section that performs determination of brightness/darkness of light received by the unit pixel on the basis of the pixel signal read from the unit pixel in a determination phase, and the determination section selectively controls execution or stop of the AD conversion processing by the AD converter on a pixel signal read subsequent to the determination phase according to a result of the determination.

(2)

The solid-state imaging device according to (1), in which the pixel signal reading mechanism includes a base signal generation circuit that generates a base signal for performing the determination of the brightness/darkness of the light received by the unit pixel in the determination phase.

(3)

The solid-state imaging device according to (1) or (2),
in which the AD converter includes a comparator that performs comparison of two input signals and outputs a comparison result signal according to a result of the comparison, and
the comparator is initialized according to a signal level of the base signal.

(4)

The solid-state imaging device according to any one of (1) to (3), further including
a reference signal generation circuit that generates a reference signal,
in which the comparator compares the reference signal supplied from the reference signal generation circuit with the pixel signal read in the determination phase, and outputs the comparison result signal.

(5)

The solid-state imaging device according to any one of (1) to (4),
in which the determination section includes a flag control circuit that sets and holds a flag indicating an operation mode according to the comparison result signal output from the comparator, and
the flag control circuit selectively performs control such that the pixel signal read subsequent to the determination phase is subjected to the AD conversion processing by the AD converter according to the operation mode indicated by the flag.

(6)

The solid-state imaging device according to (5),
in which the flag control circuit sets the flag to a high sensitivity mode on the basis of the comparison result signal indicated by the comparator in a case where a voltage level of the pixel signal is lower than a voltage level of the reference signal, and sets the flag to a low sensitivity mode on the basis of the comparison result signal indicated by the comparator in a case where the voltage level of the pixel signal is higher than the voltage level of the reference signal.

(7)

The solid-state imaging device according to (5) or (6),
in which the flag control circuit is configured to:
perform control such that the pixel signal corresponding to dark light among pixel signals read from the plurality of unit pixels is subjected to the AD conversion processing in a case where the flag indicates the high sensitivity mode; and
perform control such that the pixel signal corresponding to bright light among the pixel signals read from the plurality of unit pixels is subjected to the AD conversion processing in a case where the flag indicates the low sensitivity mode.

(8)

The solid-state imaging device according to any one of (1) to (7), further including
a signal processing section that performs image processing on the pixel signal subjected to the AD conversion processing by the AD converter,
in which the flag control circuit outputs the flag corresponding to the pixel signal subjected to the AD conversion processing to the signal processing section.

(9)

The solid-state imaging device according to any one of (1) to (8),
in which the base signal generation circuit is a source follower circuit that outputs a base signal at a constant voltage level.

(10)

The solid-state imaging device according to any one of (1) to (8),
in which the base signal generation circuit is a source follower circuit that is a dummy pixel provided in the pixel array section and outputs a base signal at a constant voltage level.

(11)

The solid-state imaging device according to (9),
in which the base signal generation circuit includes a current detection circuit that detects a current flowing through the source follower circuit, and the determination section
performs the determination of the brightness/darkness according to a detection signal output from the current detection circuit.

(12)

The solid-state imaging device according to any one of (1) to (8),
in which the solid-state imaging device causes, among the plurality of unit pixels, a unit pixel from which the pixel signal has already been read and which is in a reset state to function as the base signal generation circuit, the unit pixel being adjacent to or near a unit pixel from which the pixel signal is to be read.

(13)

The solid-state imaging device according to (12),
in which the base signal is a pixel signal read from the unit pixel in the reset state.

(14)

The solid-state imaging device according to any one of (1) to (13),
in which the unit pixel includes:
a first photoelectric conversion section that photoelectrically converts light received according to a first sensitivity; and
a first photoelectric conversion section that photoelectrically converts light received according to a second sensitivity lower than the first sensitivity, and
the pixel signal reading mechanism reads the pixel signal based on the charge photoelectrically converted by the first photoelectric conversion section and flowing into the predetermined floating diffusion region by overflow in the determination phase.

(15)

The solid-state imaging device according to any one of (1) to (14),
in which the AD converter further includes a counter that performs counting on a signal input according to a predetermined clock and outputs a counted value, and
the counter
outputs a value counted for the comparison result signal output from the comparator as pixel data in a digital format in a readout period of a pixel signal after the determination phase.

(16)

The solid-state imaging device according to any one of (1) to (15),
in which the pixel signal reading mechanism further includes a characteristic guarantee section that guarantees an operation characteristic of the reference signal generation circuit, and the flag control circuit causes the reference signal generation circuit to be connected to the characteristic guarantee section while the AD conversion processing by the AD converter is stopped.

(17)

The solid-state imaging device according to any one of (1) to (16),
in which the pixel signal reading mechanism reads the pixel signal from the unit pixel for each at least one pixel column of the pixel array section.

(18)

The solid-state imaging device according to any one of (1) to (17),
in which a plurality of the AD converter is provided in parallel corresponding to each pixel column of the pixel array section.

(19)

The solid-state imaging device according to any one of (1) to (18),
in which the pixel signal reading mechanism sequentially reads the pixel signal including a pre-charge phase pixel signal and a data phase pixel signal in time order from the predetermined floating diffusion region of the unit pixel.

(20)

The solid-state imaging device according to any one of (1) to (19),
in which the pixel signal reading mechanism includes a first read signal line that reads a pixel signal from a first floating diffusion region and a second read signal line that reads a pixel signal from a second floating diffusion region, and
the determination section performs the determination of the brightness/darkness on the basis of the pixel signal read from the second read signal line in the determination phase.

(21)

The solid-state imaging device according to any one of (1) to (20),
in which the pixel signal reading mechanism exclusively selects one of the first read signal line or the second read signal line according to a result of the determination made by the determination section, and performs control such that the AD conversion processing by the AD converter is performed on a pixel signal read from a read signal line selected.

(22)

A control method of a solid-state imaging device including a pixel array section, the control method including:
performing exposure processing on a plurality of unit pixels in the pixel array section;
reading a pixel signal based on charge accumulated in a predetermined floating diffusion region in a unit pixel of the plurality of unit pixels via a read signal line in a determination phase after the exposure processing;
performing determination of brightness/darkness of light received by the unit pixel by the exposure processing on the basis of the pixel signal read; and
performing AD conversion processing on a pixel signal read subsequent to the determination phase by an AD converter,
in which the performing the AD conversion processing includes selectively controlling execution or stop of the AD conversion processing according to a result of the determination.

(23)

The control method according to (22),
in which the performing the AD conversion processing includes:
performing the AD conversion processing on the pixel signal corresponding to dark light in a case where a result of the determination indicates that the unit pixel receives the dark light; and
performing the AD conversion processing on the pixel signal corresponding to bright light in a case where the result of the determination indicates that the unit pixel receives the bright light.

(24)

An electric device including:
a solid-state imaging device; and
a control unit that performs control on the basis of image data captured by the solid-state imaging device,
the solid-state imaging device including:
a pixel array section including a photoelectric conversion section that performs photoelectric conversion according to intensity of light received, the pixel array section including a plurality of unit pixels capable of accumulating charge photoelectrically converted by the photoelectric conversion section in a predetermined floating diffusion region;
a system control section that controls the pixel array section; and
a pixel signal reading mechanism that reads a pixel signal based on the charge from the predetermined floating diffusion region of a unit pixel of the plurality of unit pixels via a read signal line under control of the system control section,
in which the pixel signal reading mechanism includes:
an AD converter that performs AD conversion processing on the pixel signal read; and
a determination section that performs determination of brightness/darkness of light received by the unit pixel on the basis of the pixel signal read from the unit pixel in a determination phase, and
the determination section selectively controls execution or stop of the AD conversion processing by the AD converter on a pixel signal read subsequent to the determination phase according to a result of the determination.

REFERENCE SIGNS LIST

1 Solid-state imaging device
11 Pixel array section
 110 Unit pixel (pixel circuit)
  1101a First photoelectric conversion section
  1101b Second photoelectric conversion section
  1102a First transfer gate section
  1102b Second transfer gate section
  1102c, 1102c' Third transfer gate section
  1102d Fourth transfer gate section
  1102e Fifth transfer gate section
  1103 Reset gate section
  1104 Charge accumulation section
  1105a First floating diffusion section
  1105b Second floating diffusion section
  1106, 1106A, 1106B Amplification transistor
  1107, 1107A, 1107B Selection transistor
  1108 Constant current source 112 Base signal generation circuit
   1121 Amplification transistor
   1122 Selection transistor
   1123 Current detection circuit
12 Vertical drive section
13 Column processing section
   131 Reference signal generation circuit
   132 AD converter
      1321 Determination section
      1322 Comparator
      1323 Up/Down (U/D) Counter
      1324 AZ switch
      1325 Flag control circuit
   133 Output control circuit
   134 Characteristic guarantee section
14 Horizontal drive section
15 System control section
16 Signal processing section
17 Data storage section
18 Pixel drive line
19, 19A, 19B Vertical signal line

The invention claimed is:

1. A solid-state imaging device comprising:
a pixel array including a photoelectric conversion section that performs photoelectric conversion according to intensity of light received, the pixel array including a plurality of unit pixels capable of accumulating charge photoelectrically converted by the photoelectric conversion section in a predetermined floating diffusion region;
a system control circuit that controls the pixel array; and
a pixel signal reading circuit that reads a pixel signal based on the charge from the predetermined floating diffusion region of a unit pixel of the plurality of unit pixels via a read signal line under control of the system control circuit,
wherein the pixel signal reading circuit includes:
an AD converter that performs AD conversion on the pixel signal; and
a determination circuit that performs determination of brightness/darkness of light received by the unit pixel on a basis of the pixel signal read from the unit pixel in a determination phase, and
the determination circuit selectively controls executing or stopping of the AD conversion by the AD converter on a pixel signal read subsequent to the determination phase according to a result of the determination.

2. The solid-state imaging device according to claim 1, wherein the pixel signal reading circuit includes a base signal generation circuit that generates a base signal for performing the determination of the brightness/darkness of the light received by the unit pixel in the determination phase.

3. The solid-state imaging device according to claim 2, wherein the AD converter includes a comparator that performs comparison of two input signals and outputs a comparison result signal according to a result of the comparison, and
the comparator is initialized according to a signal level of the base signal.

4. The solid-state imaging device according to claim 3, further comprising
a reference signal generation circuit that generates a reference signal,
wherein the comparator compares the reference signal supplied from the reference signal generation circuit with the pixel signal read in the determination phase, and outputs the comparison result signal.

5. The solid-state imaging device according to claim 4, wherein the determination circuit includes a flag control circuit that sets and holds a flag indicating an operation mode according to the comparison result signal output from the comparator, and
the flag control circuit selectively performs control such that the pixel signal read subsequent to the determination phase is subjected to the AD conversion by the AD converter according to the operation mode indicated by the flag.

6. The solid-state imaging device according to claim 5, wherein the flag control circuit sets the flag to a high sensitivity mode on a basis of the comparison result signal indicated by the comparator in a case where a voltage level of the pixel signal is lower than a voltage level of the reference signal, and sets the flag to a low sensitivity mode on a basis of the comparison result signal indicated by the comparator in a case where the voltage level of the pixel signal is higher than the voltage level of the reference signal.

7. The solid-state imaging device according to claim 6, wherein the flag control circuit is configured to:
perform control such that the pixel signal corresponding to dark light among pixel signals read from the plurality of unit pixels is subjected to the AD conversion in a case where the flag indicates the high sensitivity mode; and
perform control such that the pixel signal corresponding to bright light among the pixel signals read from the plurality of unit pixels is subjected to the AD conversion in a case where the flag indicates the low sensitivity mode.

8. The solid-state imaging device according to claim 5, further comprising
a signal processor that performs image processing on the pixel signal subjected to the AD conversion by the AD converter,
wherein the flag control circuit outputs the flag corresponding to the pixel signal subjected to the AD conversion to the signal processor.

9. The solid-state imaging device according to claim 2, wherein the base signal generation circuit is a source follower circuit that outputs a base signal at a constant voltage level.

10. The solid-state imaging device according to claim 2, wherein the base signal generation circuit is a source follower circuit that is a dummy pixel provided in the pixel array and outputs a base signal at a constant voltage level.

11. The solid-state imaging device according to claim 10, wherein the base signal generation circuit includes a current detection circuit that detects a current flowing through the source follower circuit, and
the determination circuit
performs the determination of the brightness/darkness according to a detection signal output from the current detection circuit.

12. The solid-state imaging device according to claim 2, wherein the solid-state imaging device causes, among the plurality of unit pixels, a unit pixel from which the pixel signal has already been read and which is in a reset state to function as the base signal generation circuit, the unit pixel being adjacent to or near a unit pixel from which the pixel signal is to be read.

13. The solid-state imaging device according to claim 12, wherein the base signal is a pixel signal read from the unit pixel in the reset state.

14. The solid-state imaging device according to claim 1, wherein the unit pixel includes:
   a first photoelectric conversion section that photoelectrically converts light received according to a first sensitivity; and
   a first photoelectric conversion section that photoelectrically converts light received according to a second sensitivity lower than the first sensitivity, and
   the pixel signal reading circuit reads the pixel signal based on the charge photoelectrically converted by the first photoelectric conversion section and flowing into the predetermined floating diffusion region by overflow in the determination phase.

15. The solid-state imaging device according to claim 4, wherein the AD converter further includes a counter that performs counting on a signal input according to a predetermined clock and outputs a counted value, and the counter
   outputs a value counted for the comparison result signal output from the comparator as pixel data in a digital format in a readout period of a pixel signal after the determination phase.

16. The solid-state imaging device according to claim 4, wherein the pixel signal reading circuit further includes a characteristic guarantee circuit that guarantees an operation characteristic of the reference signal generation circuit, and further comprising:
   a flag control circuit that causes the reference signal generation circuit to be connected to the characteristic guarantee circuit while the AD conversion by the AD converter is stopped.

17. The solid-state imaging device according to claim 1, wherein the pixel signal reading circuit reads the pixel signal from the unit pixel for each at least one pixel column of the pixel array.

18. The solid-state imaging device according to claim 2, wherein a plurality of the AD converter is provided in parallel corresponding to each pixel column of the pixel array.

19. The solid-state imaging device according to claim 1, wherein the pixel signal reading circuit sequentially reads the pixel signal including a pre-charge phase pixel signal and a data phase pixel signal in time order from the predetermined floating diffusion region of the unit pixel.

20. The solid-state imaging device according to claim 1, wherein the pixel signal reading circuit includes a first read signal line that reads a pixel signal from a first floating diffusion region and a second read signal line that reads a pixel signal from a second floating diffusion region, and
   the determination circuit performs the determination of the brightness/darkness on a basis of the pixel signal read from the second read signal line in the determination phase.

21. The solid-state imaging device according to claim 20, wherein the pixel signal reading circuit exclusively selects one of the first read signal line or the second read signal line according to a result of the determination made by the determination circuit, and performs control such that the AD conversion by the AD converter is performed on a pixel signal read from a read signal line selected.

22. A control method of a solid-state imaging device including a pixel array, the control method comprising:
   performing exposure processing on a plurality of unit pixels in the pixel array;
   reading a pixel signal based on charge accumulated in a predetermined floating diffusion region in a unit pixel of the plurality of unit pixels via a read signal line in a determination phase after the exposure processing;
   performing determination of brightness/darkness of light received by the unit pixel by the exposure processing on a basis of the pixel signal; and
   performing AD conversion on a pixel signal subsequent to the determination phase by an AD converter,
   wherein the performing the AD conversion includes selectively controlling executing or stopping the AD conversion according to a result of the determination.

23. The control method according to claim 22, wherein the performing the AD conversion includes:
   performing the AD conversion on the pixel signal corresponding to dark light in a case where a result of the determination indicates that the unit pixel receives the dark light; and
   performing the AD conversion on the pixel signal corresponding to bright light in a case where the result of the determination indicates that the unit pixel receives the bright light.

24. An electric device comprising:
   a solid-state imaging device; and
   a control unit that performs control on a basis of image data captured by the solid-state imaging device,
   the solid-state imaging device including:
   a pixel array including a photoelectric conversion section that performs photoelectric conversion according to intensity of light received, the pixel array including a plurality of unit pixels capable of accumulating charge photoelectrically converted by the photoelectric conversion section in a predetermined floating diffusion region;
   a system control circuit that controls the pixel array; and
   a pixel signal reading circuit that reads a pixel signal based on the charge from the predetermined floating diffusion region of a unit pixel of the plurality of unit pixels via a read signal line under control of the system control circuit,
   wherein the pixel signal reading circuit includes:
   an AD converter that performs AD conversion on the pixel signal; and
   a determination circuit that performs determination of brightness/darkness of light received by the unit pixel on a basis of the pixel signal read from the unit pixel in a determination phase, and
   the determination circuit selectively controls executing or stopping of the AD conversion by the AD converter on a pixel signal read subsequent to the determination phase according to a result of the determination.

* * * * *